(12) United States Patent
Rongley

(10) Patent No.: US 11,932,490 B2
(45) Date of Patent: *Mar. 19, 2024

(54) AUTONOMOUS MOBILE INVENTORY TRANSPORT UNIT

(71) Applicant: Autonomous Shelf, Inc., Denver, CO (US)

(72) Inventor: Eric Rongley, Golden, CO (US)

(73) Assignee: Prime Robotics, Inc., Denver, CO (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/196,195

(22) Filed: Mar. 9, 2021

(65) Prior Publication Data
US 2021/0276805 A1 Sep. 9, 2021

Related U.S. Application Data

(60) Provisional application No. 62/986,919, filed on Mar. 9, 2020.

(51) Int. Cl.
*B65G 1/137* (2006.01)
*G06K 7/10* (2006.01)
(Continued)

(52) U.S. Cl.
CPC ....... *B65G 1/1373* (2013.01); *G06K 7/10099* (2013.01); *G06Q 10/087* (2013.01); *H04W 4/80* (2018.02)

(58) Field of Classification Search
CPC .. G06Q 10/087; B65G 1/1373; B65G 1/1375; G05D 2201/0216
See application file for complete search history.

(56) References Cited

U.S. PATENT DOCUMENTS 6,748,292 B2    6/2004  Mountz
6,819,218 B2 *  11/2004 Mabuchi ............. G07C 1/10
                                              235/382

(Continued)

FOREIGN PATENT DOCUMENTS

CA    2936393 A1    1/2017
CN    2726446 Y     9/2005
(Continued)

OTHER PUBLICATIONS

"Automated Load Measuring System", Cast Engineering, ALMS, 2016, 4 pages, Online available at <https://fuelmonitoring.org>, 2016.

(Continued)

*Primary Examiner* — Timothy R Waggoner
(74) *Attorney, Agent, or Firm* — Neugeboren O'Dowd PC

(57) ABSTRACT

A mobile inventory transportation unit (MITU) in a communication network is disclosed. The communication network may comprise the MITU, a transportation system, a first and a second central system, in communication with each other, the MITU comprising a housing, an inventory storage device, a power device, a drive device, a navigation device, a sensing device, and a control device. The MITU may be configured to receive inventory demands and handle them based on analyzing its own inventory, the transportation system may be configured to physically receive and transport the MITU, the second central system may be configured to determine an inventory demand at a second or more location and transmit the same to the first central system or the MITU, and the first central system or the MITU may be configured to schedule the movement of the MITU and control the delivery of the MITU to a final destination.

18 Claims, 10 Drawing Sheets

(51) Int. Cl.
*G06Q 10/087* (2023.01)
*H04W 4/80* (2018.01)

(56) References Cited

U.S. PATENT DOCUMENTS

| | | | |
|---|---|---|---|
| 6,950,722 | B2 | 9/2005 | Mountz |
| 7,243,001 | B2 | 7/2007 | Janert et al. |
| 7,402,018 | B2 | 7/2008 | Mountz et al. |
| 7,850,413 | B2 | 12/2010 | Fontana |
| 7,881,820 | B2 | 2/2011 | Antony et al. |
| 7,894,933 | B2 | 2/2011 | Mountz et al. |
| 7,912,574 | B2 | 3/2011 | Wurman et al. |
| 7,920,962 | B2 | 4/2011 | D'Andrea et al. |
| 8,086,344 | B1 | 12/2011 | Mishra et al. |
| 8,103,377 | B1 | 1/2012 | Wong et al. |
| 8,220,710 | B2 | 7/2012 | Hoffman et al. |
| 8,234,006 | B1 | 7/2012 | Sachar et al. |
| 8,239,291 | B2 | 8/2012 | Hoffman et al. |
| 8,265,873 | B2 | 9/2012 | D'Andrea et al. |
| 8,280,547 | B2 | 10/2012 | D'Andrea et al. |
| 8,306,650 | B1 | 11/2012 | Antony et al. |
| 8,326,452 | B2 | 12/2012 | Somin et al. |
| 8,433,437 | B1 | 4/2013 | Shakes et al. |
| 8,527,325 | B1 | 9/2013 | Atreya et al. |
| 8,594,834 | B1 | 11/2013 | Clark et al. |
| 8,606,392 | B2 | 12/2013 | Wurman et al. |
| 8,626,335 | B2 | 1/2014 | Wurman et al. |
| 8,639,382 | B1 | 1/2014 | Clark et al. |
| 8,718,814 | B1 | 5/2014 | Clark et al. |
| 8,798,784 | B1 | 8/2014 | Clark et al. |
| 8,798,786 | B2 | 8/2014 | Wurman et al. |
| 8,805,573 | B2 | 8/2014 | Brunner et al. |
| 8,805,574 | B2 | 8/2014 | Stevens et al. |
| 8,825,197 | B1 | 9/2014 | Guan |
| 8,831,984 | B2 | 9/2014 | Hoffman et al. |
| 8,892,240 | B1 | 11/2014 | Vliet et al. |
| 8,909,368 | B2 | 12/2014 | D'Andrea et al. |
| 8,930,133 | B2 | 1/2015 | Wurman et al. |
| 8,958,903 | B1 | 2/2015 | Rotella et al. |
| 8,965,562 | B1 | 2/2015 | Wurman et al. |
| 8,972,045 | B1 | 3/2015 | Mountz et al. |
| 9,008,827 | B1 | 4/2015 | Dwarakanath et al. |
| 9,008,829 | B2 | 4/2015 | Worsley |
| 9,656,805 | B1 | 5/2017 | Evans et al. |
| 9,764,836 | B1 | 9/2017 | Elzinga et al. |
| 9,916,562 | B1 | 3/2018 | Armato |
| 10,222,798 | B1 | 3/2019 | Brady et al. |
| 10,303,171 | B1 | 5/2019 | Brady et al. |
| 11,308,444 | B2* | 4/2022 | Rongley ............... G01C 21/20 |
| 11,520,337 | B2 | 12/2022 | Rongley |
| 2004/0093116 | A1 | 5/2004 | Mountz |
| 2007/0080000 | A1 | 4/2007 | Tobey et al. |
| 2008/0040182 | A1 | 2/2008 | Wegner et al. |
| 2008/0167884 | A1 | 7/2008 | Mountz et al. |
| 2011/0103924 | A1 | 5/2011 | Watt et al. |
| 2011/0153063 | A1 | 6/2011 | Wurman et al. |
| 2011/0320322 | A1 | 12/2011 | Roslak |
| 2012/0066626 | A1 | 3/2012 | Geleijnse |
| 2013/0054005 | A1 | 2/2013 | Stevens et al. |
| 2013/0103552 | A1 | 4/2013 | Hoffman et al. |
| 2013/0173049 | A1 | 7/2013 | Brunner et al. |
| 2014/0046585 | A1 | 2/2014 | Morris et al. |
| 2014/0195040 | A1 | 7/2014 | Wurman et al. |
| 2014/0350831 | A1 | 11/2014 | Hoffman et al. |
| 2015/0073589 | A1* | 3/2015 | Khodl ............... G06Q 50/30 700/218 |
| 2015/0151912 | A1 | 6/2015 | Mountz et al. |
| 2015/0151913 | A1 | 6/2015 | Wong et al. |
| 2015/0202770 | A1 | 7/2015 | Patron et al. |
| 2015/0324735 | A1 | 11/2015 | Lord et al. |
| 2015/0336270 | A1 | 11/2015 | Storr |
| 2015/0353280 | A1 | 12/2015 | Brazeau et al. |
| 2015/0353282 | A1 | 12/2015 | Mansfield et al. |
| 2016/0019497 | A1 | 1/2016 | Carvajal |
| 2016/0236867 | A1* | 8/2016 | Brazeau ............... B25J 5/007 |
| 2016/0257401 | A1 | 9/2016 | Buchmueller et al. |
| 2016/0292634 | A1 | 10/2016 | Mehring et al. |
| 2017/0088360 | A1 | 3/2017 | Brazeau et al. |
| 2017/0136931 | A1 | 5/2017 | Colantonio et al. |
| 2017/0161486 | A1 | 6/2017 | Jeon et al. |
| 2017/0217683 | A1 | 8/2017 | Lyon et al. |
| 2017/0293294 | A1 | 10/2017 | Atchley et al. |
| 2018/0024554 | A1 | 1/2018 | Brady et al. |
| 2018/0032949 | A1 | 2/2018 | Galluzzo et al. |
| 2018/0058739 | A1* | 3/2018 | Zou ............... F25B 49/00 |
| 2018/0074504 | A1 | 3/2018 | Shydo, Jr. |
| 2018/0086353 | A1 | 3/2018 | Holbrooke et al. |
| 2018/0086561 | A1 | 3/2018 | Stubbs et al. |
| 2018/0189724 | A1 | 7/2018 | Mattingly |
| 2018/0357848 | A1 | 12/2018 | McLellan et al. |
| 2019/0072979 | A1 | 3/2019 | Sukhomlinov et al. |
| 2020/0065748 | A1 | 2/2020 | Durkee et al. |
| 2020/0122927 | A1 | 4/2020 | Bellar et al. |
| 2020/0219348 | A1 | 7/2020 | Hanlon |
| 2020/0225665 | A1 | 7/2020 | Rongley |
| 2020/0364652 | A1 | 11/2020 | Rongley |
| 2020/0364653 | A1 | 11/2020 | Rongley |
| 2021/0073716 | A1 | 3/2021 | Dearing |
| 2022/0009715 | A1 | 1/2022 | Rongley |
| 2022/0012677 | A1 | 1/2022 | Rongley |
| 2022/0351118 | A1 | 11/2022 | Rongley |
| 2023/0244236 | A1 | 8/2023 | Rongley |

FOREIGN PATENT DOCUMENTS

| | | |
|---|---|---|
| CN | 203020893 U | 6/2013 |
| CN | 105314315 B | 12/2017 |
| CN | 206975763 U | 2/2018 |
| EP | 2136329 A2 | 12/2009 |
| EP | 1590272 B1 | 8/2010 |
| KR | 20190070700 A | 6/2019 |
| WO | 2007149194 A2 | 12/2007 |
| WO | 2007149703 A2 | 12/2007 |
| WO | 2020123445 A1 | 6/2020 |
| WO | 2020227379 A1 | 11/2020 |
| WO | 2020227381 A1 | 11/2020 |

OTHER PUBLICATIONS

Final Office Action received for U.S. Appl. No. 16/708,618 dated Apr. 25, 2022, 82 pages.
International Preliminary Report on Patentability received for International PCT Application Serial No. PCT/US2019/065377 dated Jun. 24, 2021, 15 pages.
International Preliminary Report on Patentability received for International PCT Application Serial No. PCT/US2020/031631 dated Nov. 18, 2021, 9 pages.
International Preliminary Report on Patentability received for International PCT Application Serial No. PCT/US2020/031634 dated Nov. 18, 2021, 8 pages.
Notice of Allowance received for U.S. Appl. No. 16/867,711 dated Dec. 14, 2021, 42 pages.
Raj et al., "Analyzing Critical Success Factors for Implementation of Drones in the Logistics Sector using Grey-DEMATEL Based Approach", Computers and Industrial Engineering, vol. 138, No. 106118, 12 pages, 2019.
Response filed on Jan. 6, 2022 for Non Final Office Action of U.S. Appl. No. 16/708,618 dated Jul. 7, 2021, 25 pages.
Response filed on Oct. 1, 2021 for Non Final Office Action of U.S. Appl. No. 16/867,711 dated Apr. 1, 2021, 25 pages.
Shead, Sam, "Amazon now has 45,000 robots in its warehouses", Business Insider, Jan. 3, 2017, https://www.businessinsider.com/amazons-robot-army-has-grown-by-50-2017-1 (Year: 2017).
Non Final Office Action received for U.S. Appl. No. 16/867,707 dated Oct. 27, 2022, 20 pages.
Non Final Office Action received for U.S. Appl. No. 17/335,541 dated Dec. 19, 2022, 47 bages.
Young, Lee, "International Search Report and Written Opinion Regarding International Application No. PCT/US2019/65377", dated Mar. 30, 2020, p. 23, Published in: US.

(56) References Cited

OTHER PUBLICATIONS

Thomas, Shane, "International Search Report and Written Opion Regarding International Application No. PCT/US20/31634", dated Aug. 7, 2020, p. 9, Published in: US.

Bruner, Nicole Elena, "Office Action Regarding U.S. Appl. No. 16/867,711", dated Apr. 1, 2021, p. 49, Published in: US.

Lee Young, "International Search Report and Written Opinion Regarding International Application No. PCT/US20/31631", dated Aug. 4, 2020, p. 16, Published in: US.

Cooley, Chase Littlejohn, "Office Action Regarding U.S. Appl. No. 16/708,618", dated Jul. 7, 2021, p. 56, Published in: US.

Thomas, Shane, "International Search Report and Written Opinion Regarding International Application No. PCT/US21/21482", dated Jul. 19, 2021, p. 25, Published in: US.

Non Final Office Action received for U.S. Appl. No. 18/075,095 dated Aug. 2, 2023, 27 pages.

Notice of Allowance received for U.S. Appl. No. 16/867,707 dated Jun. 9, 2023, 13 pages.

Notice of Allowance received for U.S. Appl. No. 16/708,618 dated Aug. 4, 2022, 25 pages.

* cited by examiner

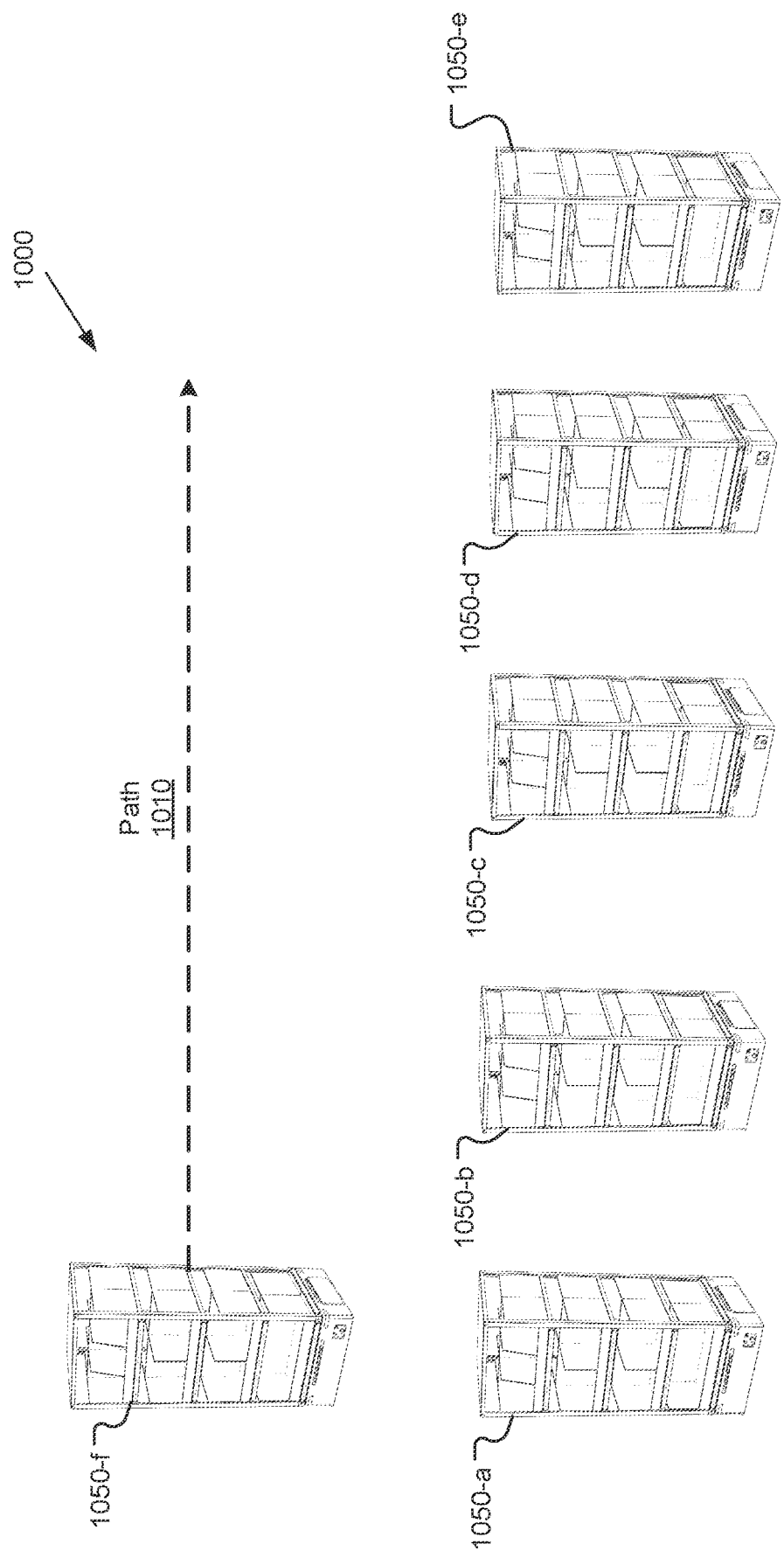

AUTONOMOUS MOBILE INVENTORY TRANSPORT UNIT

PRIORITY AND RELATED APPLICATION DATA

This application claims priority under 35 U.S.C. Section 120 to U.S. Provisional Application No. 62/986,919 filed Mar. 9, 2020, the details of which are incorporated into the present application by reference for all proper purposes.

FIELD OF THE DISCLOSURE

The present invention relates to methods and apparatuses for material handling and transportation systems. More specifically, the present invention relates to automation of product transportation systems.

DESCRIPTION OF RELATED ART

The field of automation is rapidly expanding into non-traditional functions, for instance, within the inventory management systems industry. Automation has become common in numerous applications, including online retail (e.g., warehousing, manufacturing, etc.) and airport luggage handling. In some cases, automation creates distinct advantages including higher uptime and lower revolving costs over the traditional labor force. It is estimated that automation will continue to become more prevalent in performing traditional labor tasks in these, and additional industries in the future.

While automation contributes to lower costs and higher uptimes, the rigidity and lack of awareness of current automation systems also presents numerous problems. In some cases, the centralized nature of the logic architecture controlling the robot fleets lacks scalability and leads to increased latency. For instance, current automation hardware relies on a set of instructions received from a central processing system for transporting goods. However, technological challenges arise when an autonomous operation is required from the automation system in conjunction with additional tasks, such as when an autonomous response to inventory demands is needed along with the transportation of goods. The limited capability of current robots to adapt logistically within the same or a different geographic site, particularly in response to inventory demands, has prevented automation systems from expanding beyond their currently limited capabilities.

Logistics capability aside, current techniques for warehouse automation systems include robots with limited intelligence and functionality. In some cases, such robots are configured to dock with specially modified shelves by driving under them, lifting them up, and transporting them from one point to another. While these robots have brought about some advances in inventory handling and transport, the shelves themselves have not evolved much. In other words, the shelves utilized in current warehouse automation systems have no added functionality beyond providing storage space for inventory. It should be noted, however, that these robots are in no way "intelligent", since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, light, etc.). While current techniques exist for tracking individual robots and their inventory, the processing burden lies almost entirely with the central processing system. Besides being difficult to implement, such techniques also suffer from latency issues.

Thus, there is a need for a flexible, intelligent, and autonomous robot that is not only aware of its inventory but can dynamically respond to inventory demands at more than one geographic site based on defined sets of goals and targets.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a mobile inventory transportation unit (referred herein as an "MITU"). In some cases, the MITU may be configured to operate within a mobile inventory transportation communication network, wherein the network can include one or more other MITUs, a transportation system, a first central system, and a second central system. In some examples, the MITU may be configured to respond to inventory demands within the network.

In some embodiments the MITU can include one or more hardware processors configured by machine-readable instructions. Further, the MITU can include a housing and a power device that is operationally configured to supply power to the electrical components of the mobile inventory transport unit and may be a battery cell, a fuel cell, or a solar cell source. In some embodiments, the MITU can include an inventory storage device that is physically coupled to the housing. In some embodiments, the inventory storage device may be in electrical communication with the power device, and may comprise at least one visual indicator and one or more shelves, buckets, augers, arms, and climate controlled units to hold inventory, wherein the inventory storage device is operationally configured to control the at least one visual indicator, and analyze information pertaining to the held inventory based in part on a received inventory demand. For instance, Radio Frequency Identification (RFID tags) may be affixed or attached to inventory items, while the MITU may comprise a RFID reader. In such cases, the MITU may utilize the RFID reader to scan and identify inventory items that are being added or removed from the inventory storage device. Additionally, or alternatively, the MITU or the shelves of the inventory storage device may also comprise built-in weighing scales for detecting the weight of inventory items being added to or removed from the shelves. In some circumstances, each shelf of the inventory storage device may comprise a built-in weigh scale. Further, by determining the weight of an inventory item that is added or removed from the shelf, and comparing it to one or more of a database comprising weights of various inventory items or an inbound order that was scheduled to be loaded on to the MITU, the MITU or the inventory storage device may be able to determine items that are being added to or removed from the shelf. In some other cases, the MITU or the inventory storage device may be aware of its current inventory, including weights, quantities, locations on shelves, etc. In such cases, the MITU may be able to determine items that are being added to or removed from its shelves by comparing and analyzing the weight of the currently held inventory to the previously held inventory.

As an example, an inventory storage device comprises 4 shelves, with 4 units of item A on shelf 1, 5 units of item B and 1 unit of item C on shelf 2, 6 units of item D on shelf 3, and 2 units of item E on shelf 4. Further, through an initial analysis of the currently held inventory, the inventory storage device may be aware of the shelves on which each of items A-E are placed, as well as their quantities. In this example, say 3 units of item B are removed from shelf 2, the built-in weigh scale may compare the total weight of the new inventory to the last held inventory in order to determine that 3 units of item B were removed. In other cases, the inventory storage device may only need to analyze the weight of shelf 2, since each shelf has its own individual built-in weight scale. It should be noted that the inventory storage device or the MITU may utilize the weigh scales in conjunction with RFID readers and RFID tags on inventory items, or even image recognition technologies to further enhance accuracy.

In some embodiments, the MITU can include a drive device that is in electrical communication with the power device and is operationally configured to physically move the MITU from a first point to a second point. In some embodiments, the MITU can include a navigation device that is in electrical communication with the power device and is operationally configured to transmit and receive geographic data and determine the physical location of the MITU. In further embodiments, the method of transmitting and receiving data of the navigation device may be based at least in part on a GPS, Wi-Fi, or Cellular transmission. Additionally, or alternatively, the method of transmitting or receiving may be beacon based, for instance, to account for indoor use and localization functions based on technologies other than Wi-Fi.

In some embodiments, the MITU can include a sensing device that is in electrical communication with the power device and is operationally configured to detect physical objects and transmit and receive physical object data. In further embodiments, the method of detection of physical objects of the sensing may be Light Detection and Ranging (LIDAR), Radar, Laser, ultrasonic, visual or Infrared sensing. In some embodiments, the MITU can include a control device that is in electrical communication with the power device, the drive device, the navigation device, and the sensing device, and is operationally configured to control the mobile inventory transport unit and transmit and receive data from physically separate systems, including at least receiving the inventory demand, and wherein the physically separate systems comprises a transportation system, a central system, or another mobile inventory transportation unit. In further embodiments, the method of transmitting and receiving data of the control device may be Wi-Fi, cellular, near field communication, Bluetooth, or a combination thereof.

In some other embodiments, a non-transitory, tangible computer readable storage medium, encoded with processor readable instructions to perform a method for responding to inventory demands in a mobile inventory transportation communication network is described. In some embodiments, the mobile inventory transportation communication network may comprise a mobile inventory transport unit (MITU), a transportation system, a first and a second central system. In some embodiments, the MITU can include one or more hardware processors configured by machine-readable instructions. Further, the MITU can include a housing and a power device that is operationally configured to supply power to the electrical components of the mobile inventory transport unit and may be a battery cell, a fuel cell, or a solar cell source. In some embodiments, the MITU can include an inventory storage device that is physically coupled to the housing. In some embodiments, the inventory storage device may be in electrical communication with the power device, and may comprise at least one visual indicator and one or more shelves, buckets, augers, arms, and climate controlled units to hold inventory, wherein the inventory storage device is operationally configured to control the at least one visual indicator, and analyze information pertaining to the held inventory based in part on a received inventory demand. In some embodiments, the MITU can include a drive device that is in electrical communication with the power device and is operationally configured to physically move the MITU from a first point to a second point. In some embodiments, the MITU can include a navigation device that is in electrical communication with the power device and is operationally configured to transmit and receive geographic data and determine the physical location of the MITU. In further embodiments, the method of transmitting and receiving data of the navigation device may be based at least in part on a GPS, Wi-Fi, or Cellular transmission. Additionally, or alternatively, the method of transmitting or receiving may be beacon based, for instance, to account for indoor use and localization functions based on technologies other than Wi-Fi.

In some embodiments, the MITU can include a sensing device that is in electrical communication with the power device and is operationally configured to detect physical objects and transmit and receive physical object data. In further embodiments, the method of detection of physical objects of the sensing may be Light Detection and Ranging (LIDAR), Radar, Laser, ultrasonic, visual or Infrared sensing. In some embodiments, the MITU can include a control device that is in electrical communication with the power device, the drive device, the navigation device, and the sensing device, and is operationally configured to control the mobile inventory transport unit and transmit and receive data from physically separate systems, including at least receiving the inventory demand, and wherein the physically separate systems comprises a transportation system, a central system, or another mobile inventory transportation unit. In further embodiments, the method of transmitting and receiving data of the control device may be Wi-Fi, cellular, near field communication, Bluetooth, or a combination thereof.

In some embodiments, the method comprises configuring the second central system to determine an inventory demand for at least one item at the second or more location, transmit the inventory demand to the first central system or the mobile inventory transport unit, receive data from the first central system, and transmit to and receive data from the mobile inventory transport unit, wherein the second central system is in communication with one or more of the first central system, the mobile inventory transport unit, and the transportation system. In some embodiments, the method also comprises configuring the first central system to receive data from the second central system, and transmit to and receive data from the mobile inventory transport unit, wherein the first central system is in communication with one or more of the control device of the mobile inventory transport unit, the transportation system, and the second central system. In further embodiments, the method comprises receiving, at the mobile inventory transportation unit, the inventory demand for the at least one item from at least one of the first central system and the second central system and responding to the inventory demand at the second location. In some embodiments, responding to the inventory demand at the second location comprises determining, at the mobile inventory transportation unit, a presence or an absence of the at least one item based on analyzing information pertaining to the held inventory, configuring the mobile inventory transportation unit to physically receive the at least one item based at least in part on determining the absence of the at least one item in the held inventory, scheduling by the mobile inventory transport unit, the first central system, the second central system, or a combination thereof, the transport of the mobile inventory transport unit via the transportation system, and configuring the transportation system to transmit to and receive data from the mobile inventory transport unit, physically receive the mobile inventory transport unit based at least in part on the scheduling, and physically transport the mobile inventory transport unit from the first location to the second location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 10 illustrates a sample mobile inventory transport communication network.

DETAILED DESCRIPTION

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
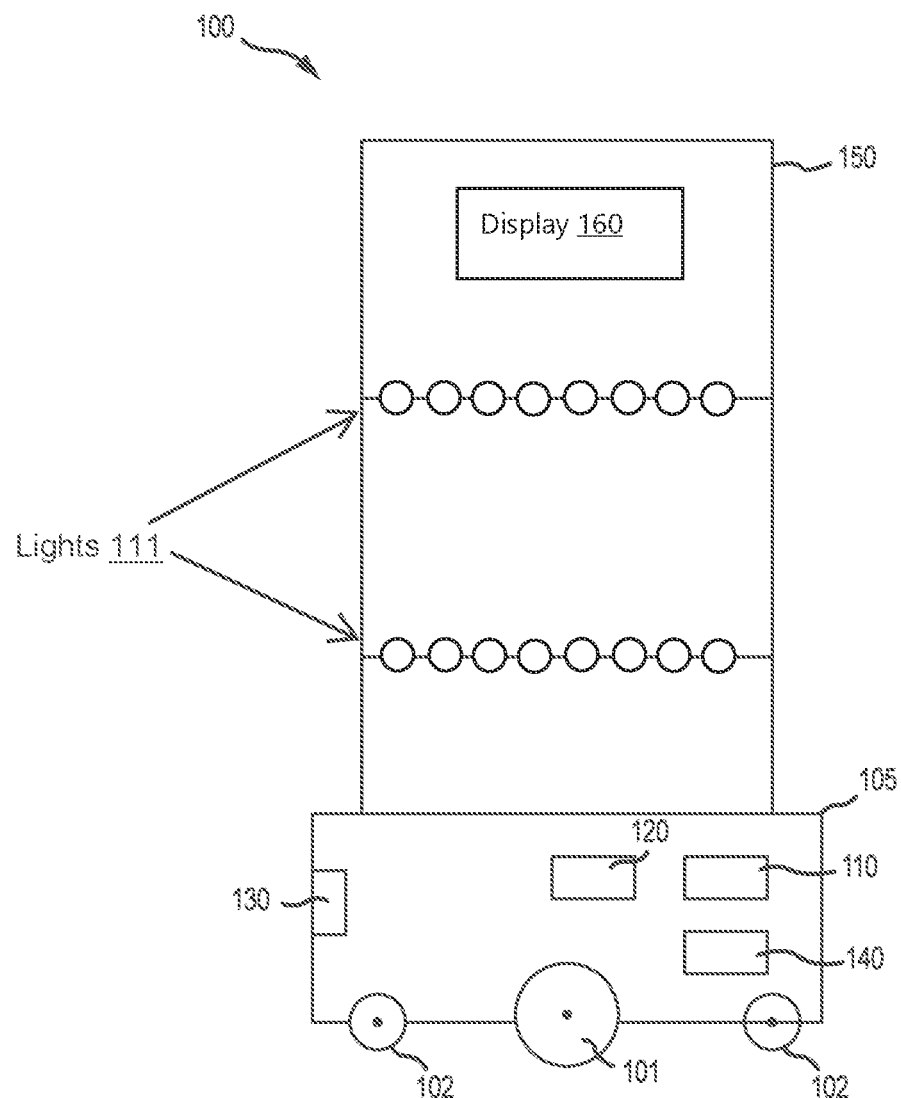
FIG. 1 illustrates a sample mobile inventory transport unit (MITU) in accordance with embodiments described herein.

FIG. 1 illustrates an example of a Mobile Inventory Transport Unit (MITU) 100. In some cases, MITU 100 may also be referred to as a smart rack robot or an autonomous smart rack robot. In some cases, MITU 100 may comprise a robot portion, including at least drive device 101, balance device 102, control device 110, navigation device 120, sensing device 130, and power device 140. Further, the MITU 100 may comprise a structural portion including at least housing 105 and inventory storage device 150. In some examples, the robot portion of the MITU 100 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing 105 and/or the inventory storage device 150.

In some examples, housing 105 encloses the electrical and physical components of contained within MITU 100. Housing 105 is physically coupled to an inventory storage device and serves as the base for the inventory storage device. Importantly, the physical coupling conjoins the inventory storage device and the housing 105 such that the two devices function as one physical object. In some cases, the housing 105 and the inventory storage device may be joined via screws, nuts and bolts, nails, any other type of fastener, or even welding.

Inventory Storage

MITU 100 includes inventory storage device 150. Inventory storage device 150 stores physical items, such as inventory, that MITU 100 moves from at least a first physical location to a second physical location, or even multiple locations. Inventory storage device 150 may be a variety of storage devices including shelves, buckets, augers, and arms. Additionally or alternatively, the inventory storage device 150 may also comprise climate controlled units for handling and transporting items (e.g., pharmaceuticals, vaccines, blood for blood banks or blood donation drives, perishable goods, beverages, etc.) that need to be kept at a certain goal temperature, further described in relation to FIG. 5. As shown, inventory storage device may be physically coupled to housing 105. In other words, the physical coupling of housing 105 and inventory storage device 150 creates one physical object. As shown, in some examples, the housing 105 and inventory storage device 150 may be in the form of a cube or a cuboid, and may be joined together via welding, or using one or more fasteners. In some other cases, a rod or pole (not shown) may pass through the center of the housing 105, where the rod is affixed to the upper portion of the housing 105. Further, the inventory storage device 150 may be installed on or around the rod, such that the rod passes through one or more shelves of the inventory storage device (i.e., shelves are perpendicular to the rod).

As indicated above, the inventory storage device 150 coupled with the robot portion of the MITU 100 may collectively be referred to as a smart rack robot. In some instances, upon loading, the inventory storage device may be operationally configured to determine information pertaining to the inventory it is holding. For instance, the smart rack robot may determine one or more of a name, a description, a quantity, a bar code or stock keeping unit (SKU), a price, a weight, a dimension, and a location within the inventory storage device for one or more items held by the storage device.

In some embodiments, the inventory storage device 150 may receive power from power device 140 of the robot portion of the MITU 100, for instance, to power lights or a display mounted on the inventory storage device. Additionally, or alternatively, the inventory storage device 150 may also comprise a power source (not shown), which may be used as a backup for power device 140. In some cases, the power may be transferred via cabling running through the center of the robot portion and the housing 105. For instance, one or more power cables may be installed around or inside the center rod (or pole) of the MITU 100. In one example, the robot portion of the MITU 100 may be configured to rotate inside the housing 105, for instance, when MITU 100 is turning at a corner. In such cases, a slip ring may be used to supply power and data to from the power device 140 to the inventory storage device 150. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing 105 and the inventory storage device 150 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc.

In some embodiments, the inventory storage device 150 may comprise one or more visual indicators, such as a rows of lights 111 (e.g., Light Emitting Diode (LED) lights).

Further, the robot portion or the inventory storage device 150 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

Additionally, or alternatively, the visual indicator may comprise a display 160, which may be mounted on the inventory storage device 150, for instance, when the MITU is configured to be deployed in a retail setting. In some cases, the display 160 may be an example of a Liquid Crystal Display (LCD), a LED display, or another High Definition (HD) display. In such cases, the display 160 may be used to display a price, or other key product information such as product specification, nutrition information and/or ingredients (if applicable), or even a product image. In some examples, the inventory storage device 150 may comprise one or more buttons adjacent (e.g., above or below) a slot or shelf on which a product is placed, and a user may view product information on the attached display by clicking the said buttons. In some embodiments, the inventory storage device may also comprise one or more cameras, Radio Frequency Identification (RFID) readers, or weigh scales for tracking inventory. In one example, a camera mounted on the inventory storage device 150 may capture images or video feeds, based on which the MITU may determine information pertaining to an item (e.g., description, quantity, etc.) that was taken off a shelf. In other cases, a RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device 150. It should be noted that the inventory storage device may incorporate one or more of the inventory tracking techniques described above.

Figure 8:
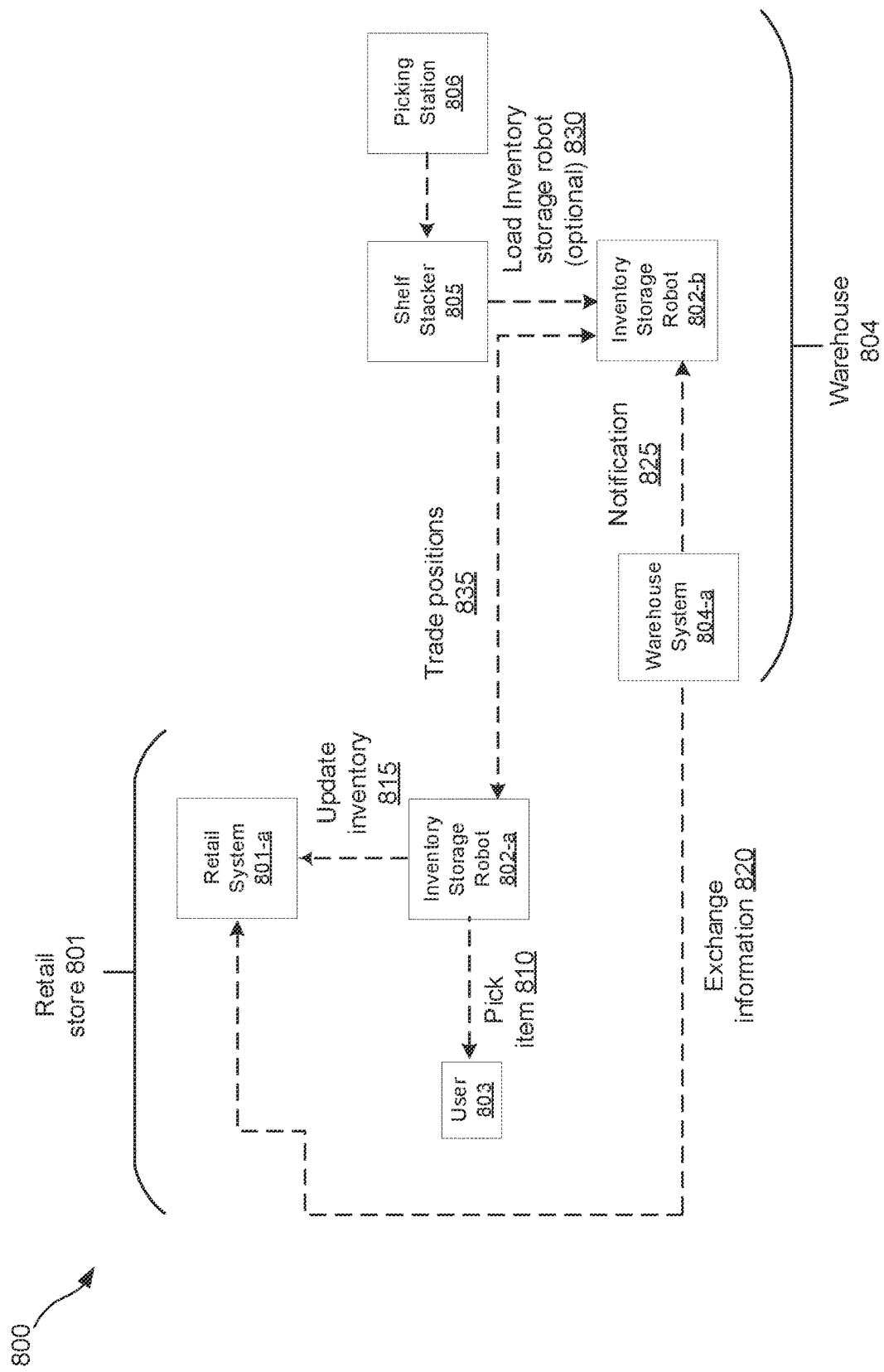
FIG. 8 illustrates a process flow for a sample mobile inventory transport communication network, in accordance with embodiments described herein.

Upon detecting the removal of one or more items from its shelves, the inventory storage device 150 may be configured to update its inventory level and relay that information to a retail store based system or to the manufacturer (e.g., if the retailer utilizes pull-based replenishment methods), as further described in relation to FIG. 8. In other cases, the inventory storage device may also be configured to alert or advise the retail store, for instance, if a customer incorrectly placed an item on its shelves. In yet other cases, the inventory storage device may be configured to issue alerts when it realizes that it is being loaded or unloaded at a time outside a scheduled or authorized time period. In some cases, the inventory storage device may flash blinking red lights or sound an audible alarm to a user of the MITU in response to such events.

Drive

In some embodiments, the MITU is configured to account for various anomalies in the environment, such as raised surfaces or other varying terrain. In those cases, the MITU may be adapted to maneuver in these environments as well. MITU 100 includes drive device 101. Drive device 101 supplies the method of moving MITU 100. Drive device 101 may be a variety of locomotion devices including one or more wheels, treads, or actuators. In some cases, drive device 101 may comprise four wheels, one on each edge or side of MITU 100. In some cases, one or more wheels may be raised up while the MITU 100 is traveling in a straight line. In some other cases, all four wheels may be in contact with the ground, for instance, to turn the MITU 100. In some embodiments, drive device 101 and control device 110 may control the pace at which the wheels rotate (i.e., same or different pace), allowing the MITU 100 to turn or take corners. In some examples, the MITU 100 may receive terrain information while navigating through a particular area from one or more other MITUs that have previously navigated through the same area, or alternatively, from a control system of a mobile inventory transport communication network, as further described in relation to FIG. 7. In other cases, the MITU 100 may identify variations in terrain in real-time, for example, via one or more sensors. The sensors may be selected from a group consisting of an accelerometer, a gyroscope, or any other sensors configured to register rapid variations in movement or spring displacement, which may indicate the presence of rough terrain. In other cases, the MITU 100 may support an "off-road" mode, which may include one or more of changing its suspension profile, spring dampening effects, and ground clearance.

In some examples, MITU 100 may be bipedal (2), quadrupedal (4), or hexapedal (6), and drive device 101 may comprise one or more legs. In some other examples, MITU 100 may comprise a combination of wheels and legs and may be referred to as a hybrid transport unit. In yet other examples, drive device 101 may enable MITU 100 to navigate by slithering (i.e., in a snake like motion). In some aspects, drive device 101 is the primary method for physically moving MITU 100 from a start point to an end point.

Balance

In some cases, MITU 100 may include balance device 102. In some cases, balance device 102 may supply weight distribution of MITU 100 and may offset the force exerted by drive device 101 when MITU 100 is either stationary or moving. In some examples, balance device 102 may incorporate a variety of balance devices including one or more wheels, one or more bearings, or a fixed apparatus. For instance, balance device 102 may be composed of two wheels, one in the front and one in the rear of the MITU 100. In some other cases, balance device 102 may comprise one or more sensors, such as a gyroscope, an accelerometer, or a combination. A gyroscope may be an example of a device used for measuring or maintaining orientation and/or angular velocity, and the orientation of the MITU 100 may be adjusted based in part on the output readings from the gyroscope. In some examples, a gyroscope or an accelerometer may be used in combination with a controller (e.g., a proportional-integral-derivative (PID) controller) to balance the MITU 100. In one example, MITU 100 or a control device 110 of MITU 100 may gather readings from one or more sensors (e.g., accelerometer or gyroscope) installed within the MITU. Further, MITU 100 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 101 may cause the MITU 100 to accelerate (or decelerate) until the difference between the angles is reduced to zero to preserve the balance.

Navigation, Sensing & Control

In some cases, the housing 105 may comprise one or more slots or openings for a sensor or sensing device 130. Further, the sensing device 130 (e.g., camera, or object detection device) may be installed such that it is aligned or substantially aligned with the one or more slots or openings. In some examples, there may be a slot or opening on each side or edge of the housing, allowing a 360-degree field of view at the MITU 100. In some embodiments, one or more edges of the housing 105 (e.g., front edge) may comprise an additional opening behind which a one or more other sensors (e.g., a LIDAR sensor) may be installed.

MITU 100 includes control device 110. Control device 110 locally controls the autonomous movement of MITU 100 in response to multiple inputs. Control Device 110 includes a control unit which incorporates software and hardware into autonomous control of MITU 100. Control device 110 may be in communication with multiple other systems including one or more central systems (e.g., warehouse system, retail system), transportation systems (e.g., vehicles or transportation providers utilized to relocate the MITU from one geographic site to another), or even other MITUs or smart rack robots (further described in relation to FIG. 6), to control the movement of MITU 100 in response to these systems' requirements. In some cases, such communication may be facilitated via Wi-Fi, Bluetooth, Near Field Communication (NFC), Cellular, Radio, or any other means.

Control device 110 is also in communication with sensing device 130 and respond to physical objects that sensing device 130 may detect. Control device 110 is also in communication with drive device 101 to control the movement of MITU 100. In some cases, control device 110 may include an analog to digital (ADC) converter to convert analog readings (or signals) from the various sensors into digital signals and may also incorporate a feedback loop. As an example, MITU 100 may be configured to travel in a straight-line while being surrounded on both sides by other objects (e.g., robots, shelves, etc.), a typical scenario inside a warehouse. Further, the control device 110 may receive information pertaining to the objects from the sensing device 130. In some cases, the sensing device 130 may comprise one or more infrared object detectors that can measure the distance from the left and right sides of the MITU 100 to the objects. The sensing device 130 may create a continuous analog voltage that depends inversely on the distance to the objects. In some cases, the analog voltage may be passed on to the ADC converter in the control device 110, following which the control device 110 computes an error (e.g., a difference between readings from the left and right sides of the robot), and adjusts the inputs to the drive device 101 until the error is reduced to zero.

MITU 100 includes navigation device 120. Navigation device 120 determines the physical position of MITU 100 and communicates the location data to the control device 110. Navigation device 120 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multistory buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 100. For instance, a MITU 100 navigating within a warehouse or building may be able to determine its location based on scanning and decoding the QR codes. In some cases, the MITU 100 may be aware of the QR code associated with an end point within the warehouse. In such cases, the MITU may navigate (e.g., in straight lines between QR codes), until the end point is reached. In one example, localization of the MITU 100 may be determined from odometry readings gathered from the drive device 101. For instance, the control device 110 or the drive device 101 may maintain an accurate count of the number of times the drive device 101 or a motor turning the wheels has turned. Further, since the diameter of the wheel and the starting point is known, the localization of the MITU 100 may be determined by calculating straight line distances between two adjacent points. As an example, if MITU 100 is navigating between a starting point A and an ending point F, via intermediate points B, C, D, and E, the control device 110 or drive device 101 may compute the number of times the drive device 101 needs to turn in order to ensure MITU 100 reaches point B, recalculates the number of times the drive device 101 needs to turn to reach point C (i.e., once point B is reached), and so on. In some cases, the MITU 100 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 100 may be configured to scan and identify codes painted in ink invisible to the human eye. Additionally, or alternatively, the MITU 100 may comprise one or more infrared LEDs for illuminating targets, which can then be identified by the camera or QR code reader. It should be noted that this camera or barcode reader may be the same as, or in addition to the camera and barcode reader utilized by the inventory storage device 150, described above.

MITU 100 includes sensing device 130. Sensing device 130 responds to physical object present near MITU 100. Sensing device 130 may incorporate a variety of sensing methods, with the primary ones being visual or infrared cameras, although others including LIDAR, Radar, Laser, ultrasound (or ultrasonic) are also envisioned. Sensing device 130 communicates the physical object data to control device 110. Single or multiple camera configurations may be incorporated in order to provide stereo camera implementations to extract other data such as depth information. In some cases, the sensing device 130 may generate a 3D virtual rendition of the warehouse or building to assist MITU 100 during navigation. In some circumstances, the MITU 100 may combine the 3D virtual model of its navigating environment with real data, such as, but not limited to, physical building measurements, real-time acquired robot's position (i.e., based on rotation of wheels, QR codes, etc.), and data acquired from laser scanning to further enhance and visualize object detection for navigation. In some other cases, the sensing device 130 may deploy a technology, referred to as Simultaneous Location and Mapping (SLAM), where data from multiple sensors may be fused together to enable the MITU 100 to locate itself in a predetermined map without the use of fixed markers (e.g., QR codes, beacons, RFID tags, etc.). It should be noted that while SLAM improves navigation flexibility as compared to QR codes, SLAM may be more difficult or costly to implement.

Power

MITU 100 includes power device 140. Power device 140 supplies power to various components of MITU 100. Power device 140 may be in electrical communication with drive device 101, control device 110, navigation device 120, sensing device 130, and inventory device 150. In some cases, power device 140 may be a battery, a fuel cell, a solar cell, to name a few non-limiting examples. In other embodiments, inductive charging or magnetic resonance charging may be utilized, which may allow the robot or MITU 100 to charge while moving, such as when the robot is moving up and down aisleways, or when MITU 100 is loaded on the transport vehicle. In such cases, the MITU 100 may not need to dock to a charge station.

In some embodiments, MITUs or autonomous smart rack robots may behave not just as individual devices, but like a swarm of devices. For instance, the power device 140 of MITU 100 may be operationally configured to request power from or relay power to another MITU in its vicinity. In some examples, such power transfer may be achieved via power connectors, such as male/female connectors or magnetically attachable power connectors located on the MITUs. In some other cases, the MITU 100 may request to use a power supply/outlet when it is running low on power, for instance, when another smart rack robot is already using the said power supply and has reached a sufficient level of charge. In some cases, a swarm of MITUs may be configured to tightly pack themselves, which serves to not only reduce floor space, but also the number of charge points needed. In some circumstances, floor mounted recharge plates may be installed on warehouse floors to propagate power to a large number of tightly packed MITUs.

Figure 2:
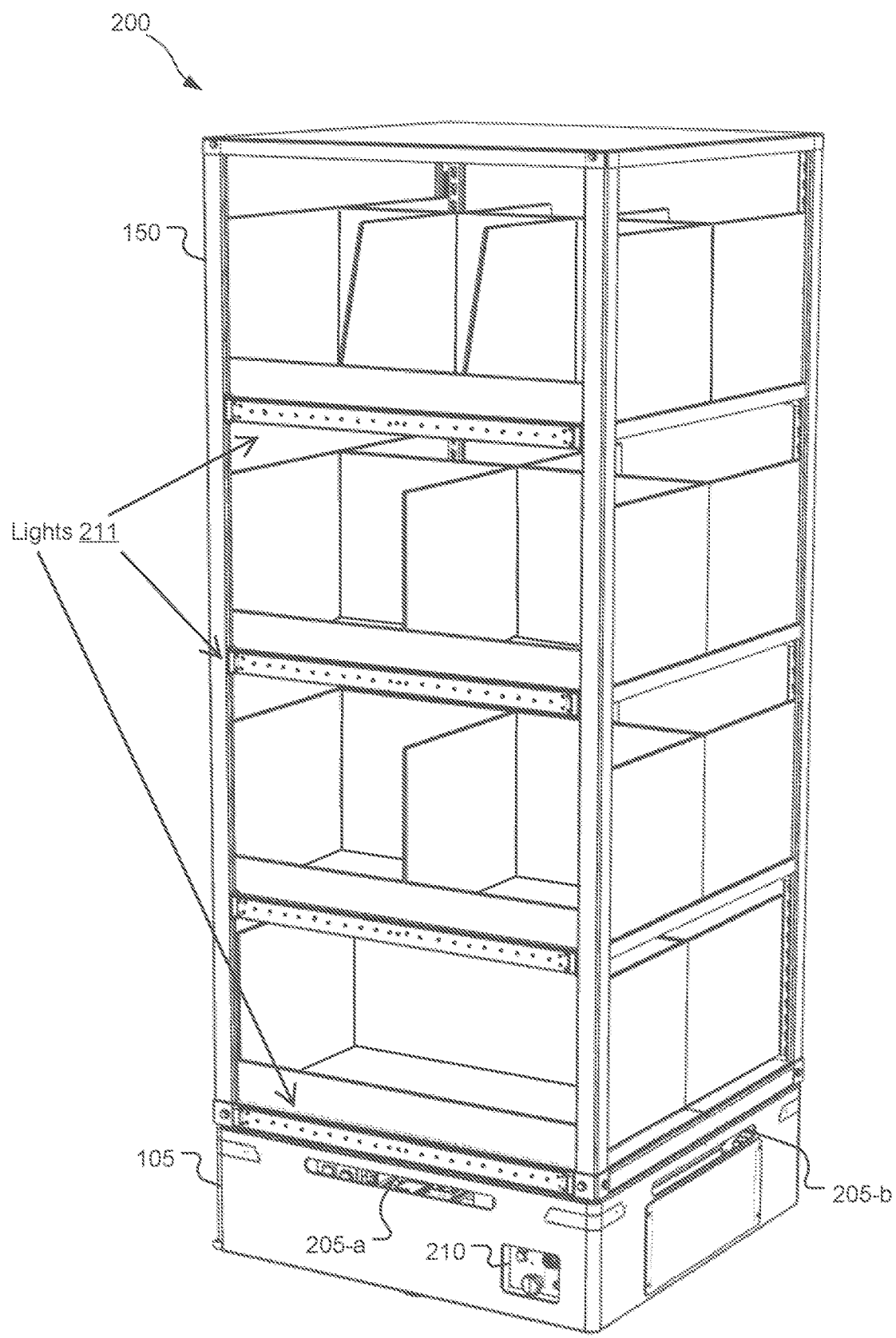
FIG. 2 illustrates a MITU in accordance with embodiments described herein.

FIG. 2 illustrates a top perspective view of a MITU 200 in accordance with one or more embodiments of the disclosure. In some cases, MITU 200 may be an example of MITU 100, as described with reference to FIG. 1, and may include one or more of its sub-components. For instance, MITU 200 may comprise a robot portion, including at least a drive device, a balance device, a control device, a navigation device, a sensing device, and a power device. Further, the MITU 200 may comprise a structural portion including at least housing 105 and inventory storage device 150. As shown, in some examples, the robot portion of the MITU 200 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing 105 and/or the inventory storage device 150.

In some embodiments, the inventory storage device 150 may comprise one or more rows of lights 211 (e.g., Light Emitting Diode (LED) lights) or a display (not shown). In some examples, the display may be an example of display 160, as described in relation to FIG. 1. In such cases, the LCD, LED display, or another HD screen may be used to display information such as product specification, pricing information, or even a product image. Further, the robot portion or the inventory storage device 150 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

In some examples, the housing 105 may comprise one or more slots 205 (e.g., slot 205-a, slot 205-b, etc.) on one or more sides/faces. In some embodiments, a sensing device may be placed behind the one or more slots 205. In such cases, the sensing device may have a clear field of view, even as the robot portion of MITU 200 rotates inside the housing 105. In some cases, housing 105 may comprise one or more manual interfaces 210. Further, the manual interface 210 may be a manual power switch through which a user can turn the MITU on/off. In some other cases, the manual interface 210 may comprise one or more connectors (i.e., metallic, conductive, or magnetic), which may be used to dock the MITU to an external charging station. In some examples, the MITU 200 may be configured to navigate autonomously to a charging station when its battery or power level falls below a threshold (e.g., 10%, 20%, etc.). In some embodiments, the MITU 200 may incorporate or substantially incorporate the functionality or features of the power device 140 of MITU 100, as described in relation to FIG. 1.

Figure 3:
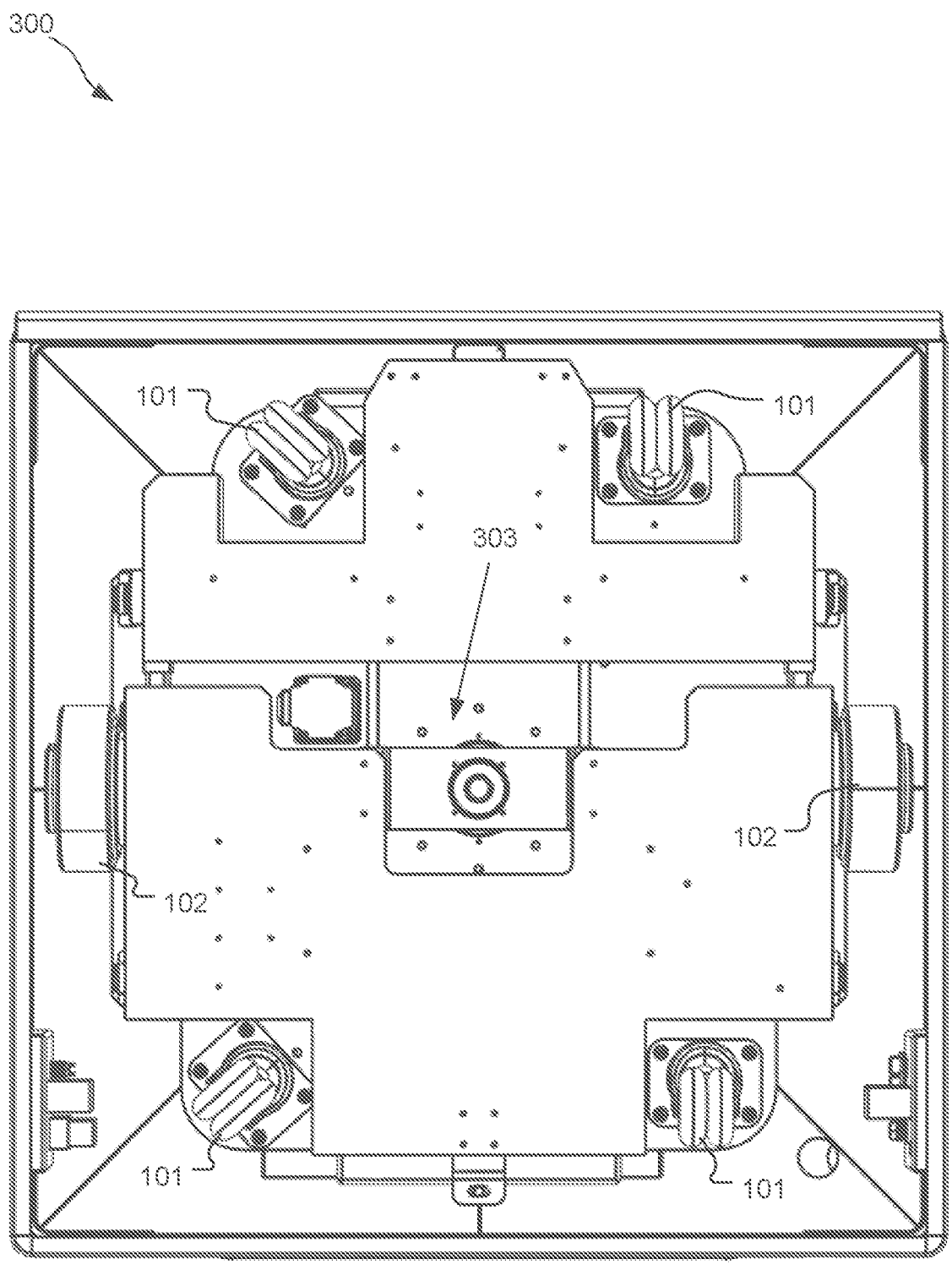
FIG. 3 is a bottom view of a MITU in accordance with embodiments described herein.

FIG. 3 is a bottom view of a MITU 300 in accordance with one or more embodiments of the disclosure. In some cases, MITU 300 may be an example of MITU 100 or MITU 200, as described with reference to FIGS. 1 and 2, respectively. Specifically, MITU 300 may incorporate at least a portion of or all of the functionality of MITUs 100 or 200 described above. For instance, MITU 300 may comprise a robot portion, including at least a drive device 101, a balance device 102, a control device, a navigation device, a sensing device, and a power device. Further, the MITU 300 may comprise a structural portion including at least a housing and an inventory storage device (not shown). In some cases, the MITU 300 may comprise one or more bottom plates to which the drive device 101 and balance device 102 are attached. Further, the bottom plates may be joined via a hinge 303, allowing the robot portion of the MITU 300 to flex during navigation (e.g., while it moves over an uneven surface). Additionally, or alternatively, the MITU 300 may comprise one or more springs (not shown) for suspension.

Figure 4:
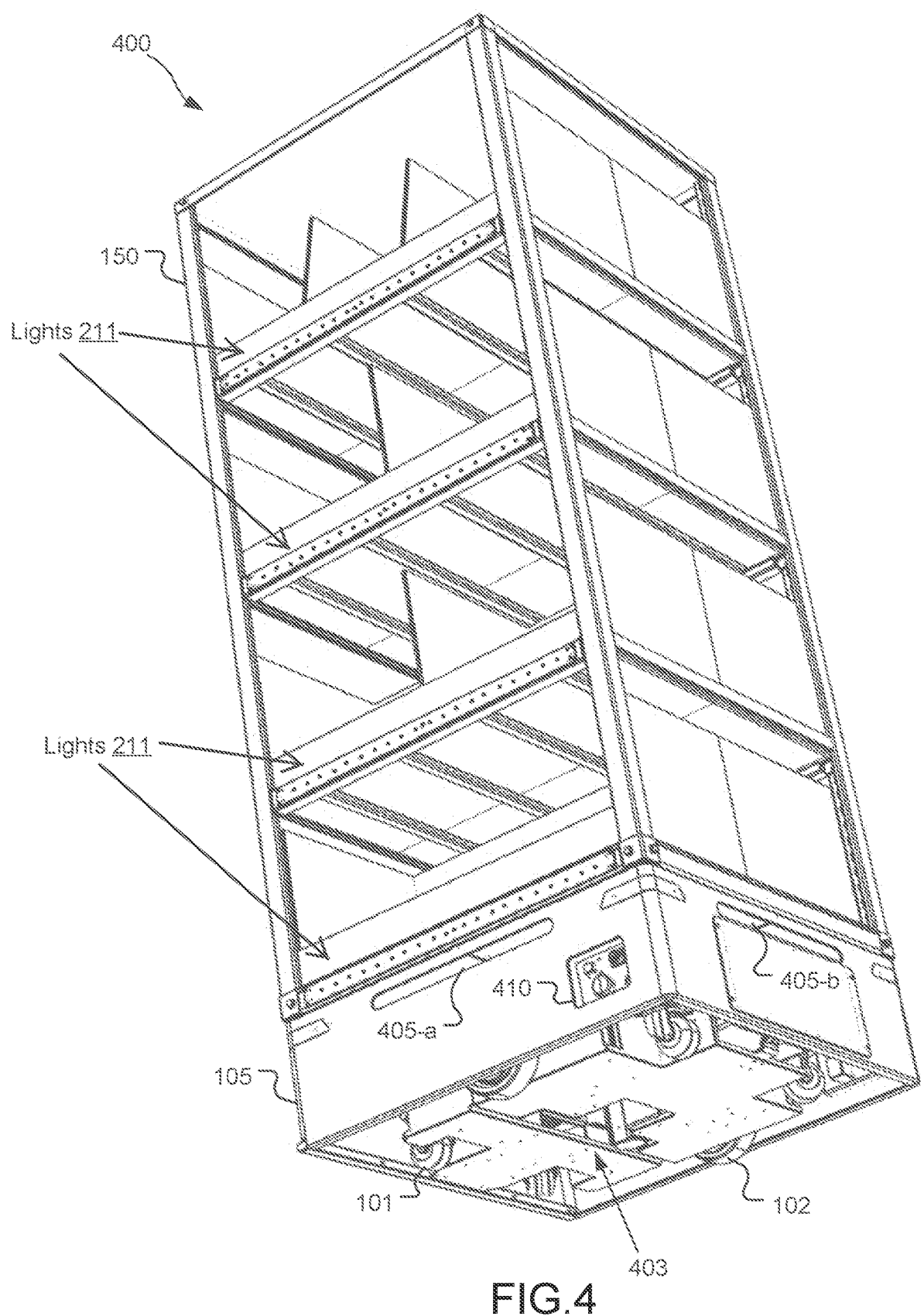
FIG. 4 is a bottom perspective view of a MITU according to various embodiments of the disclosure.

FIG. 4 illustrates a bottom perspective view of a MITU 400 in accordance with one or more embodiments of the disclosure. In some cases, MITU 400 may be an example of MITU 100 or MITU 200 or MITU 300, as described with reference to FIGS. 1, 2, and 3, respectively, and may include one or more of their sub-components. For instance, MITU 400 may comprise a robot portion, including at least a drive device 101, a balance device 102, a control device, a navigation device, a sensing device, and a power device. Further, the MITU 400 may comprise a structural portion including at least housing 105 and inventory storage device 150. As shown, in some examples, the robot portion of the MITU 400 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing 105 and/or the inventory storage device 150.

As described in relation to FIG. 2, in some embodiments, the inventory storage device 150 may comprise one or more rows of lights 211 (e.g., Light Emitting Diode (LED) lights). Further, the robot portion or the inventory storage device 150 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy. In some other cases, the rows of lights may be replaced by, or used in conjunction with a display (not shown) (e.g., Liquid Crystal Display (LCD) screen). In such cases, the LCD, LED display, or another HD screen may be used to display information such as product specification, pricing information, or even a product image. In some other cases, the display may also be utilized to display information pulled from Stock Keeping Units (SKUs) of the various items placed on the shelves of the inventory storage device. For instance, upon loading, the inventory storage device may determine information pertaining to the items it is holding, such as, where they are placed within the inventory storage device, their quantities, as well as their individual SKUs. It should be noted that a SKU may be used as a unique identification for a purchasable item or product in a store or catalog. Further, a given SKU may include bar code, price, weight, and dimension information for a product associated with the given SKU.

In some examples, the housing 105 may comprise one or more slots 405 (e.g., slot 405-a, slot 405-b, etc.) on one or more sides/faces behind which a sensing device may be placed. In some cases, housing 105 may comprise one or more manual interfaces 410. Further, the manual interface 410 may be a manual power switch through which a user can turn the MITU on/off. In some other cases, the manual interface 410 may comprise one or more connectors (i.e., metallic or conductive), allowing the MITU 400 to dock to an external charging station. In some examples, the MITU 400 may be configured to navigate autonomously to a charging station when its battery or power level falls below a threshold (e.g., 10%, 20%, etc.). Additionally, or alternatively, the MITU 400 may be configured to request power from (or relay power to) one or more other MITUs in its vicinity.

As described with reference to FIG. 3, in some cases, the MITU 400 may comprise one or more bottom plates to which one or more of the drive devices 101 and balance devices 102 may be attached. Further, the bottom plates may be joined via a hinge 403, allowing the robot portion of the MITU 400 to flex during navigation (e.g., while it moves over an uneven surface). Additionally or alternatively, the MITU 400 may comprise one or more springs (not shown) for suspension.

Figure 5:
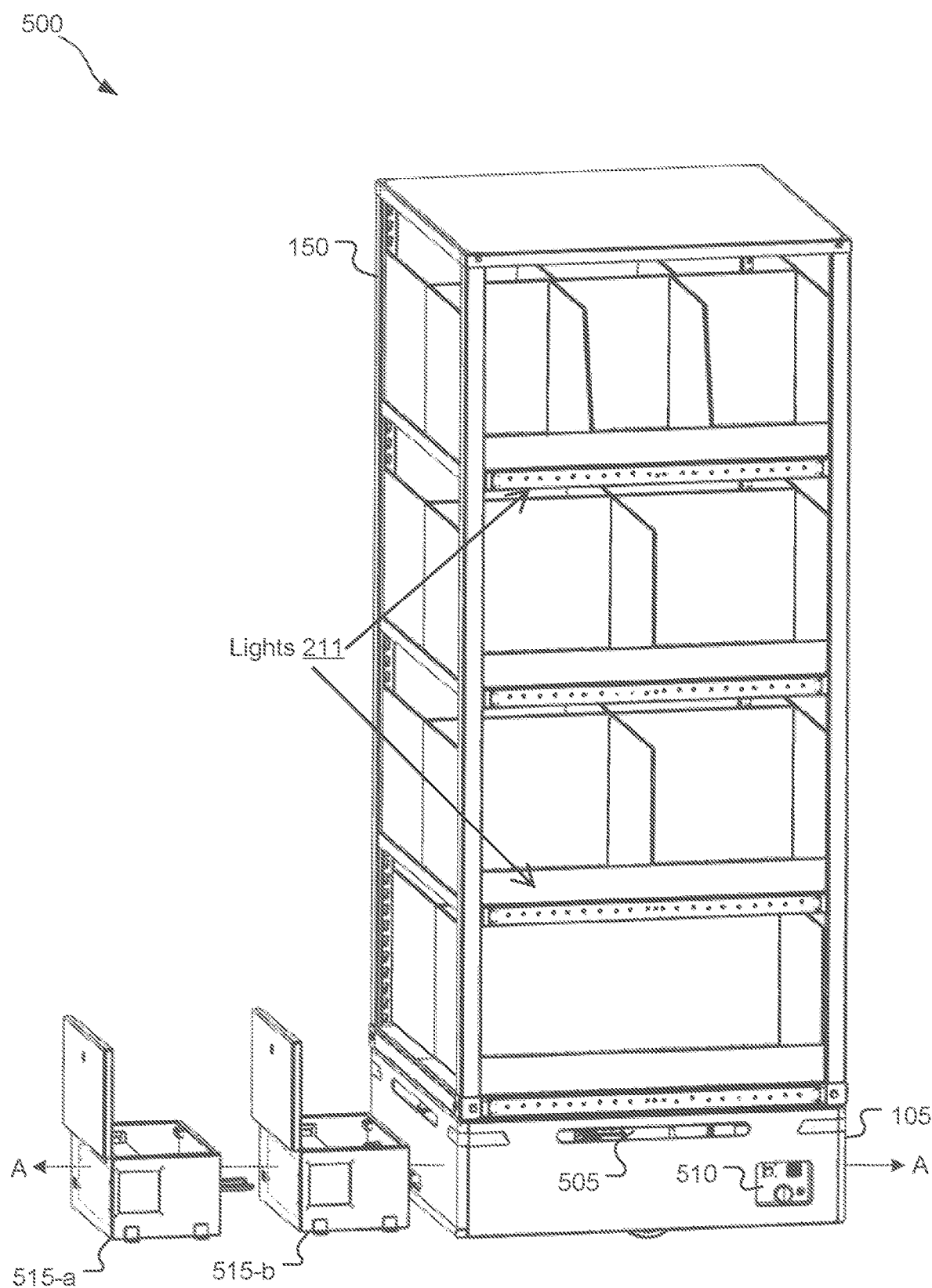
FIG. 5 is a side view of a MITU in accordance with an alternate embodiment of the disclosure.

FIG. 5 illustrates a side view of a MITU 500, in accordance with an alternate embodiment of the disclosure. In some cases, MITU 500 may be similar to or substantially similar to MITU 100 or 200 or 300 or 400, as described with reference to FIGS. 1, 2, 3, and 4, respectively. Further, MITU 500 may include one or more their sub-components. For instance, MITU 500 may comprise a robot portion, including at least a drive device, a balance device, a control device, a navigation device, a sensing device, and a power device. Further, the MITU 500 may comprise a structural portion including at least housing 105 and inventory storage device 150. As shown, in some examples, the robot portion of the MITU 500 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing 105 and/or the inventory storage device 150. In some cases, inventory storage device 150 may also comprise one or more lights 211, which may be similar to the lights 211 as described with reference to FIGS. 2 and 4.

In some examples, the housing 105 may comprise one or more slots 505 on one or more sides/faces behind which a sensing device may be placed. In some cases, housing 105 may also comprise one or more manual interfaces 510, which may be similar to the manual interfaces 410 as described with reference to FIG. 4.

As shown, in some embodiments, the housing portion of MITU 500 may comprise one or more detachable climate-controlled units 515-a, 515-b that can slide in and out of the MITU. In some examples, these climate-controlled units 515 may be electrically connected to the power device, and may be capable of both heating and cooling. In other cases, the inventory storage device 150 of MITU 500 may also be climate controlled. In such cases, the MITU 500 may be capable of transporting hot and cold items (e.g., food, beverages, medicines or vaccines, etc.).

In one example, upon loading the climate-controlled units 515, the MITU 500 may be specified a certain goal temperature (or temperature range) for those items. In such cases, the climate-controlled units or the control device of the MITU may adjust the internal temperature to stay within the specified range. In some embodiments, climate-controlled units 515-a and 515-b may be specified different goal temperatures (e.g., one unit may be used for cooling, and the other for heating). In such cases, the MITU or smart rack robot may leverage its inbuilt power and control functionality to maintain the units at their respective desired goal temperatures. In yet other cases, the MITU 500 may not be specified a goal temperature for items placed in the climate-controlled units 515, and may identify an appropriate temperature based on determining information pertaining to the one or more loaded items (e.g., via SKUs, RFID tags, barcodes, etc. of the items).

Figure 6:
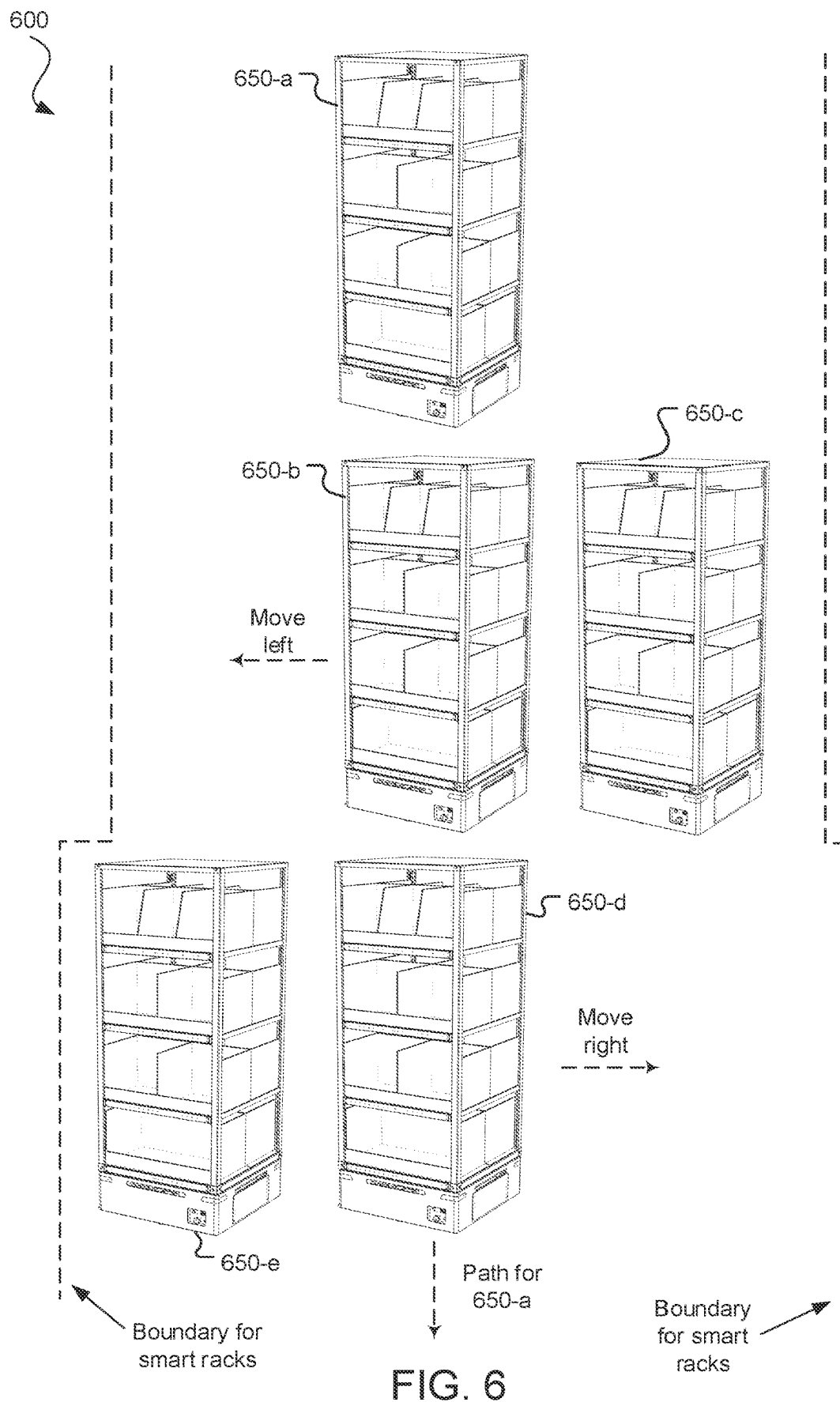
FIG. 6 illustrates a sample mobile inventory transport communication network in relation to a warehouse setting, in accordance with embodiments described herein.

FIG. 6 illustrates a sample mobile inventory transport communication network. The mobile inventory transport communication network may include a plurality of MITUs 650 (e.g., a first MITU 650-a, a second MITU 650-b, a third MITU 650-c, a fourth MITU 650-d, and a fifth MITU 650-e. In some embodiments, the MITUs 650 may be examples of MITU 100, 200, 300, 400 or 500 as described in relation to FIGS. 1-5. Further, MITUs 650 may be in communication with each other via Bluetooth, Wi-Fi, Cellular, Radio, or any other wired or wireless means of communication.

As shown, MITUs 650 may be packed tightly together (i.e., within the boundaries shown) to conserve floor space, such as in a warehouse setting. Further, MITU 650-a may be blocked behind MITUs 650-b and 650-d. In some cases, MITU 650-a may already be loaded with inventory and may be assigned a goal to meet inventory demands at a geographic site. In other cases, the MITU 650-a may receive notifications regarding inventory or items that are needed at a geographic site and determine that it is best suited to handle those needs, since it has the desired items in the required quantities. In such cases, the MITU 650-a may communicate with the one or more MITUs 650 around it and indicate that it has a higher priority level based on its ability to meet the inventory demands within the quickest time. As illustrated, upon receiving the indication from MITU 650-a, MITU 650-b may relocate to the left (i.e., since it is blocked by MITU 650-c on the right), while MITU 650-d may relocate to the right (i.e., since it is blocked by MITU 650-e on the left), thus creating a path for MITU 650-a and allowing it to meet the inventory demands. Since MITUs 650 are configured to handle, transport, as well as manage inventory (i.e., combination of robots with inventory storage units), they may serve to alleviate issues of current warehouse automation systems, which rely on a limited number of robots to service a large pool of shelves or inventory storage units. Further, as shown, communications between MITUs also optimizes the reorganization of robots on warehouse floors. For instance, in current techniques, robot systems are either configured to return a shelf or inventory storage unit back to its original location, or implement complex artificial intelligence algorithms on central servers to try to forecast which shelves have the highest chance of being used and incrementally moving them closer to pick stations. The robot system of the current disclosure simplifies this process by deploying robots that are not only aware of their current inventory, but also priority and timing information for inventory demands.

Figure 7:
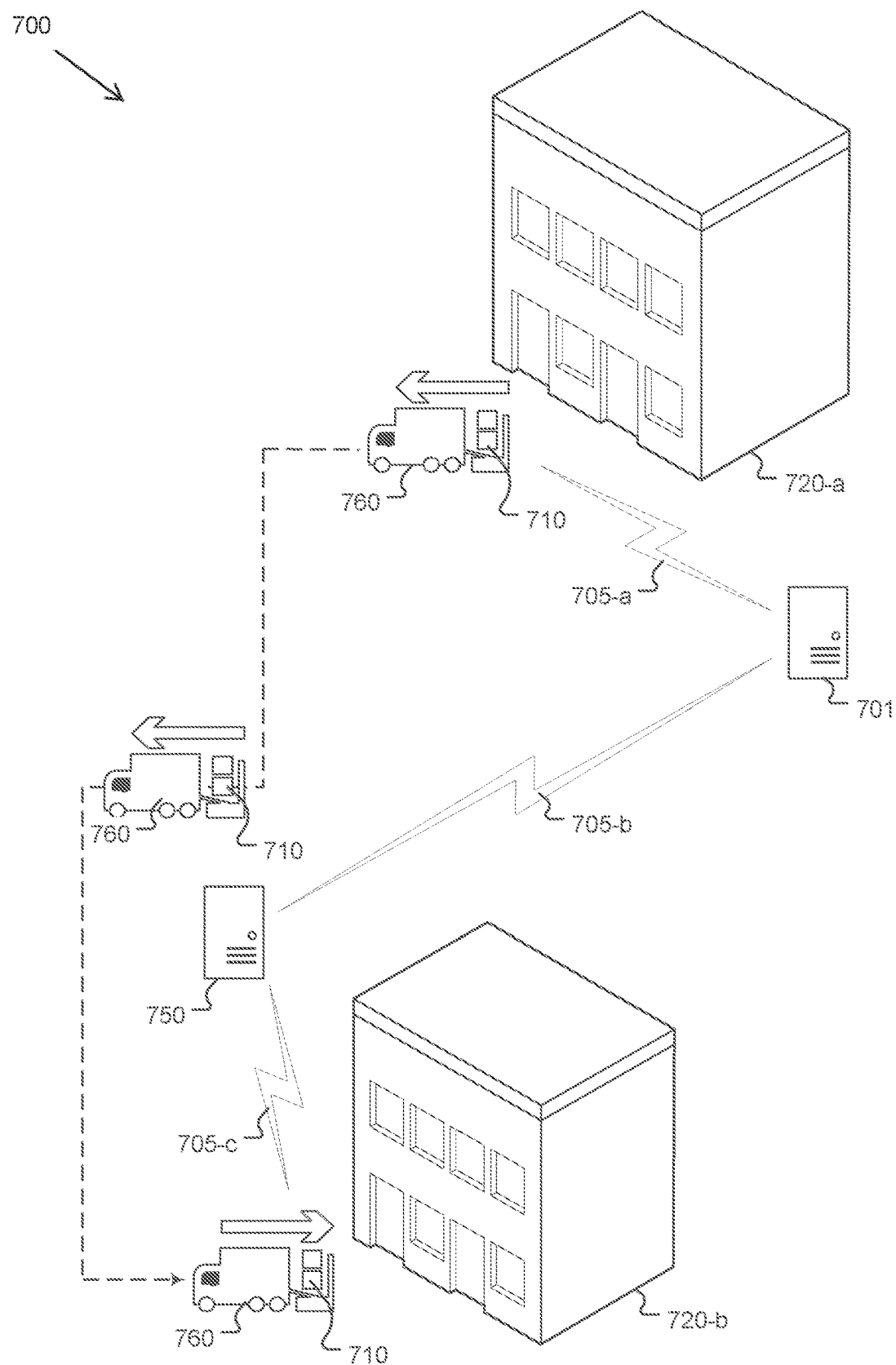
FIG. 7 illustrates a sample mobile inventory transport communication network in accordance with embodiments described herein.

FIG. 7 illustrates a sample mobile inventory transport communication network 700, according to an embodiment of the disclosure. The mobile inventory transport communication network may include a first central system 701, a first MITU 710, a second central control system 750, and a transportation system 760. In some embodiments, the first central system 701 may be an example of a warehouse or inventory dispatch system located at a warehouse and may be responsible for managing inventory demands received from the second central control system 750. Further, the second central control system 750 may be an example of a retail system located at a retail location, such as a grocery store, a department store, shopping mall, etc. In some cases, second central system 750 may be in communication with the first central system 701. Further, first central system 701 may communicate schedule, routing, and unit demands for MITUs at a first geographic site to the second central system 750 at the second geographic site. In some examples, second central system 750, similar to first central system 701, communicates its demands, scheduling and routing of MITUs.

The first central system 701 may be responsible for the cataloging and scheduling of all connected MITUs (e.g., MITU 710) that may be operating in the central systems communication network. The first central system 701 schedules the movements of the MITUs in response to demands at differing physical locations in the network. In some cases, first central system 701 may be in communication with one or more different central systems to respond to additional inventory demands outside the geographic region within which central system 701 operates. First central system 701 incorporates software and hardware to organize, schedule, and carry out the autonomous movements of the MITUs by communicating with the MITUs' local control devices. First central system 701 is also in communication with transportation systems that may be within the network. Such communication may be by Wi-Fi, cellular, Bluetooth, or any other communication means.

As an example, first central system 701 may receive an indication that the inventory level of an item at the second geographic location is low or depleted and needs to be replenished. In some embodiments, one or more MITUs (including MITU 710) at the first location may be in communication with the first central system and may also receive a ping or notification of this indication. As noted above, MITUs may be aware and knowledgeable of the inventory they are holding, and in this example, MITU 710 may realize that it is already loaded with the inventory desired at the second geographic location, and thus, best suited to handle the particular inventory demand. In such cases, MITU 710 may notify the first central system that it has the inventory in possession, upon which MITU 710 or the first central system schedules transport of the MITU 710 to the second geographic site 720-b on transportation system 760.

In some circumstances, once the transportation system 760 receives the MITU 710 in the first geographic site 720-*a*, the transportation system 760 may sometimes be in communication 705-*a* or 705-*b* with either of the central systems during its journey to the second geographic site 720-*b*. In some other cases, the transportation system 760 may always be in communication with both central systems. In yet other cases, the first central system 701 may handoff the transportation system 760 to the second central system 750 (i.e., via communication 705-*b*), for instance, based on the geographic location of the transportation system 760.

It should be noted that, transportation system 760 may be a variety of transportation systems including conveyors, elevators, or vehicles (e.g., automobiles, trucks, trains, aircrafts, boats, and/or ships). Transportation system 760 is primarily responsible for moving MITUs from a first geographic point to a second geographic point. For example, this may be accomplished by a conveyor system at a single geographic site which moves MITUs from one point to another, or it could be accomplished by loading MITUs into a vehicle and moving the MITUs to a second geographic region. Importantly, transportation system 760 is in communication with one or more central systems (e.g., first central system 701, second central system 750, etc.), and the scheduling and movement performed by transport system 760 may be monitored by a central system in order to allow for autonomous movement of the MITUs. For example, first central system 701 may communicate scheduling information to transportation system 760 and the MITUs. Further, transportation system 760 may receive the MITUs that the first central system 701 has scheduled. Once transportation system 760 has received the MITUs, it transports the MITUs to a second location. In some examples, such a location could be across a single warehouse. In some other examples, such a location could extend across a larger geographic area, such as a city, state, or even a country.

In some examples, once the MITU 710 is loaded on the transportation system, it may continue to remain in direct communication with at least the first central system 701, the second central system 750, or both. Alternatively, the MITU 710 may remain in direct communication with the first central system 701 until it reaches the second geographic site 720-*b*, following which it aborts communication with the first central system 701, and switches to communicating with the second central system 750.

In some other examples, the MITU 710 may remain in communication with the one or more central systems via the transportation system 760. For instance, the MITU 710 may communicate with the transportation system via one or more limited range communication techniques (e.g., Bluetooth or Near field Communications (NFC)), while the transportation system 760 may communicate with the central systems via one or more longer range techniques.

In some examples, the transportation system 760 and the MITU 710 may utilize a variety of techniques for communicating with the central systems, including cellular technology and Wi-Fi. Additionally or alternatively, the MITU 710 or the transportation system 760 may comprise GPS tracking chips, allowing their locations to be tracked in real-time by the central systems, which may serve to alleviate issues arising from inadequate cellular coverage (i.e., dead zones), or when the MITU 710 and its components are turned off to conserve power. It should be noted that the MITU 710 is autonomous and may be aware of the tasks it needs to complete at the second geographic site 720-*b*, prior to even leaving the first geographic site 720-*a*. In such cases, the MITU 710 may tracks its location in real-time and not disembark from the transportation system (e.g., even if the transportation system 760 breaks down, or takes a pit stop) until its GPS location matches that of the second site. Once the MITU 710 disembarks at the second site, the MITU 710 may initiate communications with the second central system (if not already initiated), determine any updates or changes to the tasks established at the first site, and respond to the inventory and scheduling demands at the second site.

As shown, both central systems, via this communication, may choreograph the movement of one or more MITUs between the two geographic areas that each central system is responsible for. This creates an interconnected network of central systems that facilitates organized movement of MITU's between multiple geographic locations, while responding to the demands of multiple systems.

FIG. 8 illustrates a sample mobile inventory process flow 800, according to an embodiment of the disclosure. The mobile inventory process flow 800 may be implemented at a retail store 801, comprising a retail system 801-*a*, a MITU 802-*a*, and a user 803. Further, the mobile inventory process flow 800 may also be implemented at a warehouse 804, comprising a warehouse system 804-*a*, at least one MITU 802-*b*, a shelf stacker 805, and a picking station 806. In some examples, the MITUs 802-*a* and 802-*b* may be examples of the MITUs described in relation to FIGS. 1-7, and retail system 801-*a* and warehouse system 804-*a* may be examples of the first and second central systems 701 and 750 described in FIG. 7, respectively. In some embodiments, MITUs 802-*a* and 802-*b* may be similar or substantially similar in their functionalities and/or capabilities. Further, in some cases, MITU 802-*a* and MITU 802-*b* may also be referred to as inventory storage robots or smart rack robots.

As shown, MITU 802-*a* may be configured to store a plurality of physical items sold at the retail store 801. For instance, MITU 802-*a* may include an inventory storage device, including one or more shelves, buckets, augers, arms, and climate-controlled units. In some embodiments, MITU 802-*a* may have been loaded with the plurality of items at warehouse 804 and transported to the retail store 801 via a transportation system. In some cases, the inventory storage device of MITU 802-*a* may be operationally configured to determine information pertaining to the inventory it is holding. For instance, MITU 802-*a* may determine one or more of a name, a description, a quantity, a bar code or stock keeping unit (SKU), a price, a weight, a dimension, and a location within the inventory storage device for one or more items held by the storage device. In some cases, the MITU 802-*a* or the inventory storage device may also comprise one or more cameras, Radio Frequency Identification (RFID) readers, or weigh scales for tracking and identifying inventory.

As described above, the inventory storage device may comprise one or more visual indicators, such as a row of lights (e.g., Light Emitting Diode (LED) lights) and the robot portion or the inventory storage device may be configured to illuminate one or more lights or an entire row of lights to assist a shelf stacker during loading/unloading. Additionally, or alternatively, a display (e.g., LED display, LCD, or another HD display) may be mounted on the inventory storage device for displaying a price or other key product information. In some examples, the inventory storage device may comprise one or more buttons adjacent (e.g., above or below) a slot or shelf on which a product is placed, and user 803 may view product information on the attached display by clicking the said buttons.

At 810, user 803 (e.g., a customer) may pick one or more items from a shelf of MITU 802-*a*. Since the MITU 802-*a* may already support one or more of Cellular, Broadband, Wi-Fi, or Bluetooth communications, the addition of a payment system may allow customers or users to directly shop from the MITU 802-*a*. In some embodiments, the MITU 802-*a* may comprise a payment system, such as a credit card reader, a digital wallet system (e.g., APPLE PAY, ANDROID PAY, etc.) utilizing Near Field Communication (NFC) technology, a chip-card reader (e.g., Europay, Mastercard and Visa (EMV) chip-card reader), or any other mobile payment or contactless payment system.

Further, at 815, MITU 802-*a* may update its inventory with retail system 801-*a*, based in part on determining at least the products or items that were taken off its shelf, as well as their weights and quantities. In some embodiments, a camera mounted on the inventory storage device may capture images or video feeds, based on which the MITU may identify the removed item(s). In other cases, the RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device.

In some examples, if the MITU 802-*a* comprises a payment system, this information may also be utilized to charge a user's payment account. In some cases, the user or customer may need to set up a payment account with the retail system or a MITU operating within the retail system. In such cases, the MITU 802-*a* may utilize one or more of facial recognition technology, a finger-print reader, iris scanner, voice recognition, or any other identification techniques to confirm the user's identity and charge their account accordingly. In some other cases, the MITU 802-*a* may require the user to present a credit card, EMV card, or mobile phone (e.g., if the user has set up a digital wallet) if the user would like to complete their transaction at the MITU 802-*a*. In yet other cases, the user may have pre-authorized MITUs, including MITU 802-*a*, in the retail system to automatically charge their payment accounts when one or more items are removed from the shelves. In such cases, the MITU 802-*a* may charge the user's payment account after confirming the identity of the user (e.g., visual identification, voice recognition, etc.) or via NFC payment technology, the latter of which may require the user to be within a certain distance from the NFC reader of the MITU.

In some embodiments, user identification, via one or more of the technologies described above, may also be used to provide a personalized shopping experience for users. In one example, one or more MITUs in the retail system may determine and store the buying histories or patterns for various users, including user 803. Further, the buying histories/patterns may be stored in a database of the retail system 801-*a* and may be accessible to other MITUs. In some cases, MITUs may identify users or shoppers currently at the retail store and predict items that they are most likely to buy based on their past buying patterns. In one example, MITU 802-*a* may provide visual or audio cues to the user 803 in order to promote items on the shelf that may be of particular interest to the user 803, for instance, when user 803 is in front of the MITU. In some cases, the visual cues may comprise highlighting a shelf (e.g., using LEDs) on the MITU 802-*a* where a particular item of interest is located, or displaying items for sale, including sale price, discount percentage, etc., on the visual display (e.g., LCD, LED Display, or another HD Display).

In some other embodiments, the inventory storage device of the MITU 802-*a* may comprise a lockable cabinet for storing big-ticket or high-ticket items, or items needing age verification, such as alcohol or cigarettes. In some cases, the MITU 802-*a* may be configured to lock such inventory items behind the cabinet door(s) and control the opening/closing of said doors. In some cases, the cabinet door(s) may be transparent, thus allowing a customer to view the items for sale. In other cases, the MITU 802-*a* may display a list of its inventory items on the visual display. In one example, if the MITU 802-*a* is carrying alcohol, a user or customer may be required to show proof of age of verification before the cabinet doors may be unlocked. In some cases, the MITU 802-*a* may confirm the user's age via a combination of an ID scanner on the MITU and visual identification (e.g., facial recognition to confirm that the picture on the ID matches the user in front of the MITU).

Similarly, the lockable cabinet of the MITU 802-*a* may also serve to optimize user experience at retail stores that allow customers to order goods online and pick them up at the store. In some cases, MITUs may comprise a plurality of lockers for storing such goods for one or more users, and users may be able to pick up their goods after confirming their identity at the MITU. In some examples, depleted MITUs may be periodically replaced using the techniques described above in relation to FIG. 7.

At 820, the retail system 801-*a* and warehouse system 804-*a* may exchange inventory information, which may include the updated inventory information for MITU 802-*a*. In some examples, the MITU 802-*a* may notify the retail system 801-*a* that its inventory level for an item is low and that item needs to be replenished. In some other cases, the retail system 801 may determine that the inventory level for an item is low, based in part on the updated inventory information received from MITU 802-*a*. In either case, the retail system 801-*a* may include an indication of the same to the warehouse system.

At 825, the warehouse system 804-*a* may send a system wide notification to one or more MITUs or inventory storage robots, including MITU 802-*b*, of the inventory demands that need to be met at retail store 801. In one example, MITU 802-*b* may determine that it is already in possession of the one or more items that need to be replenished at the retail store and may notify the warehouse system 804-*a* of the same. In such cases, the MITU 802-*b* or the warehouse system 804-*a* may schedule transport of the MITU 802-*b* to the retail store via a transportation system, as described in relation to FIG. 7. In another example, the MITU 802-*b* may transport itself to picking station 806 for loading by the shelf stacker 805 at 830. It should be noted that the shelf stacker 805 may be a worker employed at the warehouse 804 or may be an automated robot that is configured to load/unload MITUs. In some examples, if the shelf stacker 805 is front of the MITU 802-*b*, MITU 802-*b* may highlight the part of each shelf that needs replenishment, as well as the quantity of the inventory items.

In some circumstances, after MITU 802-*b* is transported to retail store 801 by the transportation system, MITUs 802-*a* and 802-*b* may trade positions at 835. Furthermore, MITU 802-*b* may initiate communications with the retail system 801-*a* right before or upon arrival. Similar to MITU 802-*a*, MITU 802-*b* may also transmit an indication of its initial inventory level and send regular inventory update information to the retail system 801-*a*. After trading positions at 835, in some cases, transportation system may be used to transport MITU 802-*a* back to the warehouse 804.

In some embodiments, the operations of the methods described below may be implemented by a MITU or its components described herein, a first central system, a second central system, and a transportation system. For example, the following operations may be performed by the drive device, the balance device, control device, housing, navigation device, sensing device, power device, and inventory storage device of the MITU, as described with reference to FIGS. 1-8. In some examples, the MITU, the transportation system, or a central system may execute a set of codes to control the functional elements of the devices or systems to perform the functions described below. Additionally, or alternatively, the MITU and other systems may perform aspects of the functions described below using special-purpose hardware. In some cases, the first and second central systems may be examples of a warehouse automation system and a retail automation system, respectively, as described in reference to FIG. 8.

In some cases, a second central system (i.e., at a second geographic site) may send an inventory request to a first central system (i.e., at a first geographic site). After receiving the inventory request, the first central system may determine a MITU to meet the second site's request (e.g., related to an inventory demand). In some aspects, the first central system may determine the MITU to meet the inventory request based upon the central cataloging of all MITUs controlled by the first central system. In some cases, the MITU may be an example of MITU 100, described with reference to FIG. 1. In some other cases, a MITU may directly receive the inventory request from the second central system. For instance, the second central system may transmit a system wide notification or broadcast which may be periodically monitored by the first central system, MITUs, the transportation system, etc.

In some examples, the first central system may communicate with the MITU selected to meet the inventory demand, following which the selected MITU moves to a first position. In one example, the first central system may determine the scheduling and movement destination of the MITU, and the MITU, via communication with the central system, receives the destination and scheduling information from the first central system. Further, the MITU responds to this information and moves to the first position. In some other cases, the MITU may be aware of the inventory it is holding, as described in FIGS. 1-8 above. In such cases, if the MITU determines that its currently held inventory can adequately meet the inventory demands, the MITU may notify the first central system or the second central system.

In some circumstances, the MITU may indicate or communicate to the first central system that it has reached the first position, upon which the central system may then communicate with a transportation system. The transportation system may be the same as the transportation system described with reference to FIG. 7. In some cases, the central system schedules the movement that the transportation system will perform on the MITU. Additionally or alternatively, the MITU may initiate communications with a transportation system once it reaches the first position. For instance, the first central system may instruct the MITU to initiate communications with a particular transportation system amongst the numerous transportations systems at that site. In some other cases, the MITU may be configured to schedule its own transport to the second geographic site via the one or more transportation systems. The communication also facilitates the MITU moving onto the transportation system once the transportation system has received scheduling and movement instructions from the central system.

In some embodiments, the MITU may embark or move onto the transportation system from the first position, or a second position different from the first position. In some cases, the MITU may communicate to the transportation system that it is loaded on to the transportation system and ready to be transported. In some other cases, the transportation system may recognize that the MITU is on the transportation system based on scanning and identifying an RFID tag, QR code, Bluetooth module, etc., associated with the MITU, analyzing changes in weight distribution, or through visual inspection or object recognition. In some examples, the fixed distance traveled by the transportation system may be across the same geographic site (e.g., between two opposite ends of a warehouse). In some other cases, the fixed distance may span tens of miles (e.g., across a city, a state, or multiple states).

Furthermore, the MITU may continue to communicate with the transportation system once on the transportation system. In some examples, the transportation system, via its communication with the central system, determines the scheduling of the MITU disembarking the transportation system at the MITU's scheduled destination. In some examples, the MITU may be aware of its own scheduling, and may be configured to determine alternate routes or paths in order to meet inventory demands. In one example, if the MITU determines that it won't be able to meet inventory demands using the route chosen by the transportation system or the central system, it may request movement via another transportation system using a quicker route or one with less stops. Alternatively, the MITU may request the transportation system to drop it off first (i.e., before other MITUs on the same transportation system), based on analyzing the inventory schedules for the other MITUs. In some cases, MITUs may be configured to exchange inventory schedules amongst each other, or via the central systems, to optimize delivery routes.

In some embodiments, the MITU may disembark from the transportation system at a third position, wherein the third position may be at a second geographic site different from the first geographic site. In some other cases, the third position may be at the same geographic site, but the third position may be different from the first and the second position. In some cases, the MITU may only disembark from the transportation system once the transportation system has completed the scheduled movement of the MITU. Once the MITU disembarks from the transportation system at the third position, it carries out the remainder of its scheduled movement to the final destination. In some examples, the MITU may move to its final destination, which may correspond to the location scheduled by the first and second central systems in the initial communication operations.

In another embodiment, the central system is capable of re-tasking other inventory to fulfill orders which may have been delayed in transit and that won't meet a particular delivery timeline. For example, if a truck (i.e., a transportation system) transporting a MITU anticipates a potential delay in delivery (e.g., if the truck is stuck in traffic) based on knowledge of the timing and delivery schedule, the MITU or the truck may communicate the potential delay to the central server. In such cases, the central server system may be capable of re-tasking a new shelf to fulfill the order in an attempt to meet the delivery deadline, as well as reroute the delayed shelf. In similar embodiments, the MITU or transportation system can re-task itself once it has anticipated a delayed delivery.

In yet another embodiment, the systems may include a locating beacon, where the locating beacon may comprise a visual indicator, a radio frequency (RF) transmission, a Received Signal Strength Indicator (RSSI), or any other format. In these embodiments, a MITU may serve as an added input to the localization algorithm. For instance, if a MITU knows its precise location information, it may convey that information to other MITUs (e.g. while they are in motion) passing by.

Figure 9:
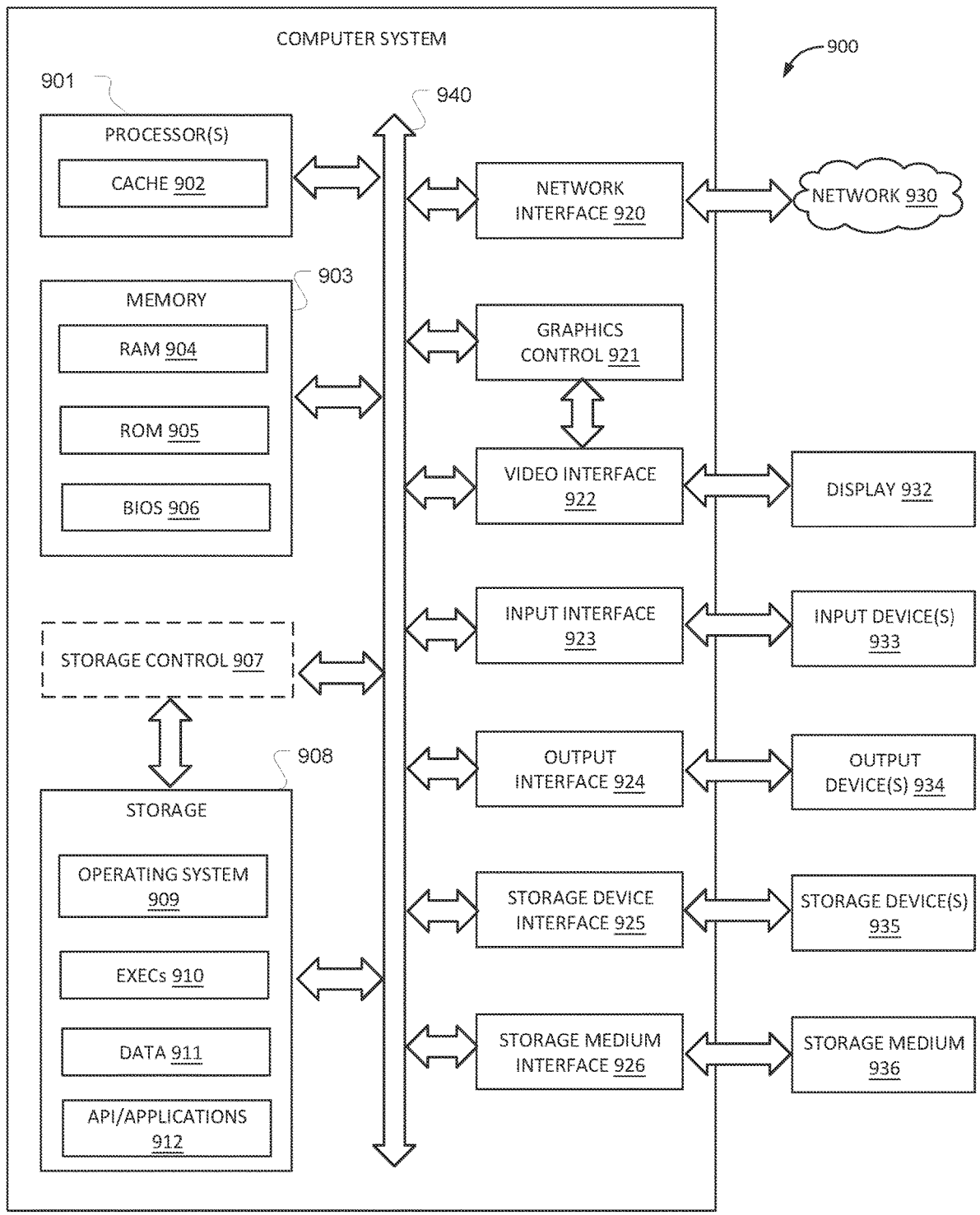
FIG. 9 is a block diagram depicting an exemplary machine that includes a computer system within which a set of instructions can be executed for causing a device to perform or execute any one or more of the aspects and/or methodologies of the present disclosure.

Referring to FIG. 9, it is a block diagram depicting an exemplary machine that includes a computer system 900 within which a set of instructions can be executed, causing a device to perform or execute any one or more of the aspects and/or methodologies of the present disclosure. The components in FIG. 9 are examples only and do not limit the scope of use or functionality of any hardware, software, embedded logic component, or a combination of two or more such components implementing particular embodiments.

Computer system 900 may include a processor 901, a memory 903, and a storage 908 that communicate with each other, and with other components, via a bus 940. The bus 940 may also link a display 932, one or more input devices 933 (which may, for example, include a keypad, a keyboard, a mouse, a stylus, etc.), one or more output devices 1134, one or more storage devices 1135, and various tangible storage media 936. All of these elements may interface directly or via one or more interfaces or adaptors to the bus 940. For instance, the various tangible storage media 936 can interface with the bus 940 via storage medium interface 926. Computer system 900 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 901 (or central processing unit(s) (CPU(s))) optionally contains a cache memory unit 902 for temporary local storage of instructions, data, or computer addresses. Processor(s) 901 are configured to assist in execution of computer readable instructions. Computer system 900 may provide functionality for the components depicted in the above figures as a result of the processor(s) 901 executing non-transitory, processor-executable instructions embodied in one or more tangible computer-readable storage media, such as memory 903, storage 908, storage devices 935, and/or storage medium 936. The computer-readable media may store software that implements particular embodiments, and processor(s) 901 may execute the software. Memory 903 may read the software from one or more other computer-readable media (such as mass storage device(s) 935, 936) or from one or more other sources through a suitable interface, such as network interface 920. The software may cause processor(s) 901 to carry out one or more processes or one or more steps of one or more processes described or illustrated herein. Carrying out such processes or steps may include defining data structures stored in memory 903 and modifying the data structures as directed by the software.

The memory 903 may include various components (e.g., machine readable media) including, but not limited to, a random-access memory component (e.g., RAM 904) (e.g., a static RAM "SRAM", a dynamic RAM "DRAM, etc.), a read-only component (e.g., ROM 905), and any combinations thereof. ROM 905 may act to communicate data and instructions unidirectionally to processor(s) 901, and RAM 904 may act to communicate data and instructions bidirectionally with processor(s) 901. ROM 905 and RAM 904 may include any suitable tangible computer-readable media described below. In one example, a basic input/output system 906 (BIOS), including basic routines that help to transfer information between elements within computer system 900, such as during start-up, may be stored in the memory 903.

Fixed storage 908 is connected bidirectionally to processor(s) 901, optionally through storage control unit 1107. Fixed storage 908 provides additional data storage capacity and may also include any suitable tangible computer-readable media described herein. Storage 908 may be used to store operating system 1109, EXECs 910 (executables), data 911, API applications 912 (application programs), and the like. Often, although not always, storage 908 is a secondary storage medium (such as a hard disk) that is slower than primary storage (e.g., memory 903). Storage 908 can also include an optical disk drive, a solid-state memory device (e.g., flash-based systems), or a combination of any of the above. Information in storage 908 may, in appropriate cases, be incorporated as virtual memory in memory 903.

In one example, storage device(s) 935 may be removably interfaced with computer system 900 (e.g., via an external port connector (not shown)) via a storage device interface 925. Particularly, storage device(s) 935 and an associated machine-readable medium may provide nonvolatile and/or volatile storage of machine-readable instructions, data structures, program modules, and/or other data for the Computer system 900. In one example, software may reside, completely or partially, within a machine-readable medium on storage device(s) 935. In another example, software may reside, completely or partially, within processor(s) 901.

Bus 940 connects a wide variety of subsystems. Herein, reference to a bus may encompass one or more digital signal lines serving a common function, where appropriate. Bus 940 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 900 may also include an input device 933. In one example, a user of computer system 900 may enter commands and/or other information into computer system 900 via input device(s) 933. Examples of an input device(s) 933 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 933 may be interfaced to bus 940 via any of a variety of input interfaces 923 (e.g., input interface 923) including, but not limited to, serial, parallel, game port, USB, FIREWIRE, THUNDERBOLT, or any combination of the above.

In particular embodiments, when computer system 900 is connected to network 930, computer system 900 may communicate with other devices, specifically mobile devices and enterprise systems, connected to network 930. Communications to and from computer system 900 may be sent through network interface 920. For example, network interface 920 may receive incoming communications (such as requests or responses from other devices) in the form of one or more packets (such as Internet Protocol (IP) packets) from network 930, and computer system 900 may store the incoming communications in memory 903 for processing. Computer system 900 may similarly store outgoing communications (such as requests or responses to other devices) in the form of one or more packets in memory 903 and communicated to network 930 from network interface 920. Processor(s) 901 may access these communication packets stored in memory 903 for processing.

Examples of the network interface 920 include, but are not limited to, a network interface card, a modem, and any combination thereof. Examples of a network 930 or a segment of network 930 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 930, may employ a wired and/or a wireless mode of communication. In general, any network topology may be used.

Information and data can be displayed through a display 932. Examples of a display 1032 include, but are not limited to, a liquid crystal display (LCD), an organic liquid crystal display (OLED), a cathode ray tube (CRT), a plasma display, and any combinations thereof. The display 932 can interface to the processor(s) 901, memory 903, and fixed storage 908, as well as other devices, such as input device(s) 933, via the bus 940. The display 932 is linked to the bus 940 via a video interface 1122, and transport of data between the display 932 and the bus 940 can be controlled via the graphics control 921. In addition to a display 932, computer system 900 may include one or more other peripheral output devices 934 including, but not limited to, an audio speaker, a printer, and any combinations thereof. Such peripheral output devices may be connected to the bus 940 via an output interface 924. Examples of an output interface 924 include, but are not limited to, a serial port, a parallel connection, a USB port, a FIREWIRE port, a THUNDERBOLT port, and any combinations thereof.

In addition, or as an alternative, computer system 900 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

FIG. 10 illustrates a sample mobile inventory transport communication network 1000. The mobile inventory transport communication network may include a plurality of MITUs 1050 (e.g., a first MITU 1050-*a*, a second MITU 1050-*b*, a third MITU 1050-*c*, a fourth MITU 1050-*d*, and a fifth MITU 1050-*e*. In some embodiments, the MITUs 1050 may be examples of MITU 100, 200, 300, 400, 500, or 650 as described in relation to FIGS. 1-6. Further, MITUs 1050 may be in communication with each other via Bluetooth, Wi-Fi, Cellular, Radio, or any other wired or wireless means of communication. In some cases, MITUs 1050 may also comprise one or more sensing devices that are operationally configured to detect physical objects and transmit and receive physical object data. In some embodiments, the method of detection of physical objects of the sensing may be Light Detection and Ranging (LIDAR), Radar, Laser, ultrasonic, visual or Infrared sensing.

In some examples, MITUs 1050 may utilize their array of sensing devices from different vantage points or perspectives to optimize their level of situational awareness (i.e., create a version of reality). Specifically, by sharing their individual levels of awareness amongst each other, the MITUs 1050 in FIG. 10, other MITUs (not shown), and the central system may enhance their understandings of the environment they are operating in.

In the example shown, a plurality of idle MITUs 1050 (i.e., MITU 1050-*a* through *e*) may be parked adjacent to each other in a horizontal line. Further, they may be in communication with a central system, such as a warehouse system, as previously described in relation to FIGS. 7 and 8. In some cases, one or more of these MITUs 1050 may have already notified the central system that they are idle and ready to respond to inventory demands. In this example, the central system may direct the sixth MITU 1050-*f* to handle a mission, such as responding to an inventory demand or drive along a path 1010 in front of the other MITUs 1050. In some embodiments, while MITU 1050-*f* is driving along the path 1010, it may periodically report its position to the central system or release a waypoint as it confirms its passing the waypoint. In some other embodiments, the idle MITUs 1050 may also be utilized to confirm the reality of MITU 1050-*f*'s path. For instance, one or more of the idle MITUs 1050 may utilize their onboard sensing devices, described above, to detect the approaching MITU 1050-*f*. In some cases, these idle MITUs 1050 may utilize a combination of ultrasonic, LIDAR, microphones, cameras, etc., for detecting MITU 1050-*f*.

In some circumstances, the first MITU 1050-*a* may detect the presence, location, and/or trajectory of MITU 1050-*f* and report it to the other MITUs 1050 and the central system. Further, MITU 1050-*b* may also detect the presence, location, and trajectory of MITU 1050-*f* at the same time as MITU 1050-*a*, but from a slightly different perspective. Similarly, the other idle MITUs 1050 also detect and report the same or similar information on MITU 1050-*f*, each from a different perspective. In other cases, wireless communications may be analyzed to "paint" a version of reality or better gauge situational awareness. In some cases, such as in a mesh network transport layer, pings between nodes may serve to optimize localization by acting as triangulation inputs. In this case, the MITUs 1050 may serve as nodes, and location detection/accuracy of the various MITUs 1050, including MITU 1050-*f*, may be enhanced by analyzing pings between the MITUs 1050.

In some circumstances, the system (i.e., the central server and MITUs 1050) may utilize inputs from the different sources to enhance their level of situational awareness, for instance, to determine the exact location, trajectory, speed, etc. of MITU 1050-*f*. In some cases, this shared knowledge of reality may also assist in distributing the workload of path planning in a control territory with a high density of robots, such as in a warehouse. In some cases, feedback noise may be eliminated prior to determining situational awareness or reality. For instance, if two robots are on a path of collision, or have been involved in a collision, input from other robots may serve little to no purpose in resolving their issues. In this case, the input from the other robots in their vicinity may be treated as noise and eliminated. Further, the two robots may identify each other, and communicate and negotiate how they intend to maneuver around each other with minimal loss to speed or safety.

In some aspects, situational awareness may be based in part on combining inputs from a plurality of sources or agents within a space and assigning confidence levels to the information gathered from those agents to arrive at an estimate of a truth. It should be noted, however, that even after arriving at an estimate of the truth, it might not be guaranteed. As an example, in FIG. 10, MITU 1050-*e* may report that MITU 1050-*f* is in front of it, while the input received from MITU 1050-*f* and the other idle robots says otherwise. That is, the system may consider the input from MITU 1050-*e* to be unreliable since MITUs 1050-*a* through *d* and MITU 1050-*f* confirm the same reality that MITU 1050-*f* is in front of MITU 1050-*a*. As another example, if the input received from the MITUs 1050 was conflicting substantially (e.g., three robots report one reality, and the other three report a second, different reality), the central system may direct one or more other MITUs 1050 (not shown) to gather additional input from that area to determine the reality.

Beyond location and mapping awareness, situational awareness technology may be expanded to other areas, such as inventory awareness (e.g., awareness of shelves and their inventory within a given area/control territory). Additionally or alternatively, inventory awareness may be combined with inputs from store sensors to determine the clientele at a retail store, their buying patterns, specific interests, etc. In one example, one or more MITUs may reorganize themselves (e.g., form a customized aisle based on customer knowledge) at a retail location or present a different side of the MITU in order to display items that a particular customer is more likely to buy, based on such awareness.

Alternate Embodiments

A number of alternate embodiments disclosed herein are listed below.

One aspect of the present disclosure may relate to a system configured for directing and controlling a supply chain control territory in an autonomous inventory management system. The system may include one or more hardware processors configured by machine-readable instructions. The processor(s) may be configured to negotiate a dispatch routine between an autonomous robot, such as a MITU, and an external control system, such as a warehouse or retail system, where the MITU is configured to transport an inventory item. The processor(s) may be configured to assign a token to the MITU and the external control system. The token may provide an identification signal between the MITU and the external control system. The processor(s) may be configured to register a MITU departure event with the external control system. The processor(s) may be configured to provide a secure connection between the MITU and a first transport controller. The processor(s) may be configured to authenticate the connection between the MITU and the first transport controller. The processor(s) may be configured to give, by the first transport controller, the MITU permission to access a specified geographic territory at a delivery location.

Another aspect of the present disclosure relates to a method for directing and controlling a supply chain control territory in an autonomous inventory management system. The method may include negotiating a dispatch routine between a MITU and an external control system, the MITU configured to transport an inventory item. The method may include assigning a token to the MITU and the external control system. The token may provide an identification signal between the MITU and the external control system. The method may include registering a departure event for the MITU with the external control system. The method may include providing a secure connection between the MITU and a first transport controller. The method may include authenticating the connection between the MITU and the first transport controller. The method may include giving, by the first transport controller, the robot permission to access a specified geographic territory at a delivery location.

Yet another aspect of the present disclosure relates to a computing platform configured for directing and controlling a supply chain control territory in an autonomous inventory management system. The computing platform may include a non-transient computer-readable storage medium having executable instructions embodied thereon. The computing platform may include one or more hardware processors configured to execute the instructions. The processor(s) may execute the instructions to negotiate a dispatch routine between a MITU and an external control system, the MITU configured to transport an inventory item. The processor(s) may execute the instructions to assign a token to the MITU and the external control system. The token may provide an identification signal between the MITU and the external control system. The processor(s) may execute the instructions to register a MITU departure event with the external control system. The processor(s) may execute the instructions to provide a secure connection between the MITU and a first transport controller. The processor(s) may execute the instructions to authenticate the connection between the MITU and the first transport controller. The processor(s) may execute the instructions to give, by the first transport controller, the MITU permission to access a specified geographic territory at a delivery location.

Still another aspect of the present disclosure relates to a system configured for directing and controlling a supply chain control territory in an autonomous inventory management system. The system may include means for negotiating a dispatch routine between a MITU and an external control system, the MITU configured to transport an inventory item. The system may include means for assigning a token to the MITU and the external control system. The token may provide an identification signal between the MITU and the external control system. The system may include means for registering a departure event for the MITU with the external control system. The system may include means for providing a secure connection between the MITU and a first transport controller. The system may include means for authenticating the connection between the MITU and the first transport controller. The system may include means for giving, by the first transport controller, the MITU permission to access a specified geographic territory at a delivery location.

Even another aspect of the present disclosure relates to a non-transient computer-readable storage medium having instructions embodied thereon, the instructions being executable by one or more processors to perform a method for directing and controlling a supply chain control territory in an autonomous inventory management system. The method may include negotiating a dispatch routine between a MITU and an external control system, the MITU configured to transport an inventory item. The method may include assigning a token to the MITU and the external control system. The token may provide an identification signal between the MITU and the external control system. The method may include registering a departure event for the MITU with the external control system. The method may include providing a secure connection between the MITU and a first transport controller. The method may include authenticating the connection between the MITU and the first transport controller. The method may include giving, by the first transport controller, the MITU permission to access a specified geographic territory at a delivery location.

Another aspect is the delegating of control to the new territory as controlled by the original or master territory. As part of the authentication process the master territory may for example assign permissions to the host (visiting) territory, where the host (visiting) territory can tell the MITU where to go, what time to do certain things, but cannot change the prescribed date the MITU should leave the host territory and return to the master territory.

There may be one or more levels of MITU control that could be delegated. At a core level, such control may include rules that all robots must adhere to, like not injuring a human, while other levels may for example, determine the robot's priority to recharge. In a store that may have robots or MITUs from many different suppliers, such prioritization may be critical for the host control territory.

Another aspect relates to tracking of MITUs or robots by an owner, such as where they have been dispatched. In some embodiments, when a new robot or MITU enters its host (visiting) territory it may be provided instructions on how and when to communicate back to its master territory, or even the type of information it is permitted to communicate back to the master territory. In some cases, the MITU may need to obey the network security rules set out in the handshake process.

In some other cases, a MITU may arrive at a host territory with a general idea of the rules that need to be adhered to while in the host territory, but may determine that the host territory has changed the onsite rules for the MITU, for instance, during the handshake process. In such cases, the robot or MITU may decide if it should enter the host territory based on an internal set of rules set at the master territory (i.e., ignore rules set by the host territory), or communicate the change of rules back to the controller at the master territory and wait for a decision about whether to enter or refuse to enter the host control territory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A mobile inventory transportation unit for responding to an inventory demand, comprising:
one or more hardware processors configured by machine-readable instructions,
a housing,
a power device, wherein the power device is operationally configured to supply power to at least one electrical component of the mobile inventory transportation unit, and is selected from a group consisting of a battery cell, fuel cell, and solar cell,
an inventory storage device, wherein the inventory storage device is physically coupled to the housing and is in electrical communication with the power device, the inventory storage device comprising at least one visual indicator and one or more shelves, buckets, augers, arms, and climate controlled units configured to hold inventory items, and wherein the inventory storage device is operationally configured to control the at least one visual indicator, and analyze information pertaining to held inventory items based in part on a received inventory demand,
a drive device, wherein the drive device is in electrical communication with the power device, and is operationally configured to physically move the mobile inventory transportation unit from a first point to a second point,
a navigation device, wherein the navigation device is in electrical communication with the power device, and is operationally configured to transmit and receive geographic data and determine a physical location of the mobile inventory transportation unit at a first site,
a sensing device, wherein the sensing device is in electrical communication with the power device, and is operationally configured to detect physical objects and transmit and receive physical object data, and
a control device, wherein the control device is in electrical communication with the power device, the inventory storage device, the drive device, the navigation device, and the sensing device, and is operationally configured to:
  receive, from at least one of a first central system and a second central system, the inventory demand for the inventory item to transport from the first site to a second site, wherein the first central system is configured to manage inventory for the first site and the second central system is configured to manage inventory for the second site;
  communicate the inventory demand to the inventory storage device for determining a presence or an absence of the inventory item with respect to the inventory storage device;
  communicate with at least one of the drive device, the navigation device, and the sensing device to position the inventory storage device to physically receive the inventory item based at least in part on determining the absence of the inventory item with respect to the inventory storage device; and
  communicate with at least one of the first central system and the second central system to schedule the mobile inventory transportation unit for transport from the first site to the second site via a transportation system.

2. The mobile inventory transportation unit of claim 1, wherein analyzing information pertaining to the inventory item comprises:
determining, in a held inventory, the presence or the absence of the inventory item indicated in the received inventory demand, based in part on one or more of a name, a description, a quantity, a bar code, a price, a weight, a dimension, and a location within the inventory storage device for one or more items held by the inventory storage device.

3. The mobile inventory transportation unit of claim 1, wherein the inventory storage device further comprises at least one of a Radio Frequency Identification (RFID) reader, a camera, or a built-in weighing scale for determining when an item is added or removed from the inventory storage device, based at least in part on a RFID tag attached to the added item or the removed item, visual identification of the added item or the removed item, correlating a weight of the added item to known weights of items in a database, or correlating a weight of the removed item with weights and locations of the one or more items held by the inventory storage device, respectively.

4. The mobile inventory transportation unit of claim 3, wherein the inventory storage device is operationally configured to update an inventory level based in part on determining the removal of the item.

5. The mobile inventory transportation unit of claim 1, wherein the at least one visual indicator comprises one or more lights or Light Emitting Diodes (LEDs) on the one or more shelves, buckets, augers, and arms, or a visual display mounted on the inventory storage device.

6. The mobile inventory transportation unit of claim 5, wherein the inventory storage device is operationally configured to illuminate at least one light on a shelf, bucket, auger, or arm while a user is loading or unloading the inventory storage device during an authorized time period.

7. The mobile inventory transportation unit of claim 6, wherein the control device is operationally configured to transmit an alert based at least in part on determining that an item is added or removed from the inventory storage device at a time outside of the authorized time period.

8. The mobile inventory transportation unit of claim 5, wherein the inventory storage device is operationally configured to display a price or key product information for an item held by the inventory storage device via the visual display, and wherein the visual display is selected from a group consisting of a High Definition (HD) display, a Liquid Crystal Display (LCD), or a LED display.

9. The mobile inventory transportation unit of claim 1, wherein the inventory storage device further comprises a climate controlled unit, and wherein the control device is operationally configured to control a temperature within the climate controlled unit based at least in part on one or more items stored within the climate controlled unit.

10. The mobile inventory transportation unit of claim 9, wherein the one or more items stored within the climate-controlled unit comprises pharmaceuticals, vaccines, or perishable goods.

11. The mobile inventory transportation unit of claim 1, wherein transmitting and receiving data is accomplished by using GPS, Wi-Fi, or Cellular.

12. The mobile inventory transportation unit of claim 1, wherein detecting physical objects of the sensing device is accomplished by using Light Detection and Ranging (LIDAR), Radar, Laser, ultrasonic, or Infrared sensing.

13. The mobile inventory transportation unit of claim 1, wherein transmitting and receiving data of the control device is accomplished using Wi-Fi, cellular, or Bluetooth.

14. The mobile inventory transportation unit of claim 1, wherein the transportation system comprises a vehicle.

15. The mobile inventory transportation unit of claim 1, wherein the transmitting and receiving data from the physically separate systems is accomplished using Wi-Fi, cellular, or Bluetooth.

16. The mobile inventory transportation unit of claim 1, wherein the control device is operationally configured to request power from the transportation system or the second mobile inventory transportation unit, or relay power to the second mobile inventory transportation unit via power connectors, magnetically attached power connectors, inductive charging, or magnetic resonance charging.

17. A non-transitory, tangible computer readable storage medium, encoded with processor readable instructions to perform a method for responding to inventory demands in a mobile inventory transportation communication network, the mobile inventory transportation communication network comprising at least a mobile inventory transport unit, a transportation system, a first central system, and a second central system, the mobile inventory transport unit comprising:
a housing,
a power device, wherein the power device is operationally configured to supply power to at least one electrical component of the mobile inventory transportation unit, and is selected from a group consisting of a battery cell, fuel cell, and solar cell,
an inventory storage device, wherein the inventory storage device is physically coupled to the housing and is in electrical communication with the power device, the inventory storage device comprising at least one visual indicator and one or more shelves, buckets, augers, arms, or climate controlled units to hold inventory, and wherein the inventory storage device is operationally configured to analyze information pertaining to a held inventory and control the at least one visual indicator,
a drive device, wherein the drive device is in electrical communication with the power device, and is operationally configured to physically move the mobile inventory transport unit from a first point to a second point,
a navigation device, wherein the navigation device is in electrical communication with the power device, and is operationally configured to transmit and receive geographic data and determine a physical location of the mobile inventory transport unit,
a sensing device, wherein the sensing device is in electrical communication with the power device, and is operationally configured to detect physical objects and transmit and receive physical object data, and
a control device, wherein the control device is in electrical communication with the power device, the inventory storage device, the drive device, the navigation device, and the sensing device, and is operationally configured to control the mobile inventory transportation unit and transmit and receive data from physically separate systems, and wherein the physically separate systems comprises the transportation system, the first and the second central system, or another mobile inventory transportation unit;
the method comprising:
configuring the second central system to determine an inventory demand for at least one item at a second site, transmit the inventory demand to the first central system or the mobile inventory transport unit, receive data from the first central system, and transmit to and receive data from the mobile inventory transport unit, wherein the second central system is in communication with one or more of the first central system configured to manage inventory for a first site, the mobile inventory transport unit, and the transportation system, configuring the first central system to receive data from the second central system, and transmit to and receive data from the mobile inventory transport unit, wherein the first central system is in communication with one or more of the control device of the mobile inventory transport unit, the transportation system, and the second central system, receiving, at the mobile inventory transportation unit, the inventory demand for the at least one item from at least one of the first central system and the second central system; and responding to the inventory demand at the second site, wherein responding to the inventory demand comprises:

determining, at the mobile inventory transportation unit, a presence or an absence of the at least one item based on analyzing information pertaining to the held inventory, configuring the mobile inventory transportation unit to physically receive the at least one item based at least in part on determining the absence of the at least one item in the held inventory, scheduling by the mobile inventory transport unit, the first central system, the second central system, or a combination thereof, the transport of the mobile inventory transport unit via the transportation system, and configuring the transportation system to transmit to and receive data from the mobile inventory transport unit, physically receive the mobile inventory transport unit based at least in part on the scheduling, and physically transport the mobile inventory transport unit from the first site to the second site.

18. A method for responding to inventory demands in a mobile inventory transportation communication network, the mobile inventory transportation communication network comprising at least a mobile inventory transport unit, a transportation system, a first central system, and a second central system, the mobile inventory transport unit comprising:

a housing, a power device, wherein the power device is operationally configured to supply power to at least one electrical component of the mobile inventory transportation unit, and is selected from a group consisting of a battery cell, fuel cell, and solar cell, an inventory storage device, wherein the inventory storage device is physically coupled to the housing and is in electrical communication with the power device, the inventory storage device comprising at least one visual indicator and one or more shelves, buckets, augers, arms, and climate controlled units to hold inventory, and wherein the inventory storage device is operationally configured to analyze information pertaining to a held inventory and control the at least one visual indicator, a drive device, wherein the drive device is in electrical communication with the power device, and is operationally configured to physically move the mobile inventory transport unit from a first point to a second point, a navigation device, wherein the navigation device is in electrical communication with the power device, and is operationally configured to transmit and receive geographic data and determine the physical location of the mobile inventory transport unit, a sensing device, wherein the sensing device is in electrical communication with the power device, and is operationally configured to detect physical objects and transmit and receive physical object data, and a control device, wherein the control device is in electrical communication with the power device, the inventory storage device, the drive device, the navigation device, and the sensing device, and is operationally configured to control the mobile inventory transportation unit and transmit and receive data from physically separate systems, and wherein the physically separate systems comprises the transportation system, the first and the second central system, or another mobile inventory transportation unit;

the method comprising:

configuring the second central system to determine an inventory demand for at least one item at a second site, transmit the inventory demand to the first central system or the mobile inventory transport unit, receive data from the first central system, and transmit to and receive data from the mobile inventory transport unit, wherein the second central system is in communication with one or more of the first central system configured to manage inventory for a first site, the mobile inventory transport unit, and the transportation system, configuring the first central system to receive data from the second central system, and transmit to and receive data from the mobile inventory transport unit, wherein the first central system is in communication with one or more of the control device of the mobile inventory transport unit, the transportation system, and the second central system, receiving, at the mobile inventory transportation unit, the inventory demand for the at least one item from at least one of the first central system and the second central system; and responding to the inventory demand at the second site, wherein responding to the inventory demand comprises:

determining, at the mobile inventory transportation unit, a presence or an absence of the at least one item based on analyzing information pertaining to the held inventory, configuring the mobile inventory transportation unit to physically receive the at least one item based at least in part on determining the absence of the at least one item in the held inventory, scheduling by the mobile inventory transport unit, the first central system, the second central system, or a combination thereof, the transport of the mobile inventory transport unit via the transportation system, and configuring the transportation system to transmit to and receive data from the mobile inventory transport unit, physically receive the mobile inventory transport unit based at least in part on the scheduling, and physically transport the mobile inventory transport unit from the first site to the second site.

\* \* \* \* \*